US012775554B2

(12) United States Patent
Hossain et al.

(10) Patent No.: US 12,775,554 B2
(45) Date of Patent: Oct. 27, 2026

(54) ADDRESS TRANSLATION SERVICES TO ENABLE MEMORY COHERENCE

(71) Applicant: NVIDIA Corporation, Santa Clara, CA (US)

(72) Inventors: Hemayet Hossain, San Jose, CA (US); Wishwesh Anil Gandhi, Sunnyvale, CA (US); James Leroy Deming, Madison, AL (US); William Craig McKnight, Harvest, AL (US); Mark Hairgrove, San Jose, CA (US); Vikramjit Sethi, Austin, TX (US); Steven Edward Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 63 days.

(21) Appl. No.: 18/665,382

(22) Filed: May 15, 2024

(65) Prior Publication Data

US 2025/0291728 A1 Sep. 18, 2025

Related U.S. Application Data

(60) Provisional application No. 63/566,139, filed on Mar. 15, 2024.

(51) Int. Cl.

| | |
|---|---|
| ***G06F 12/0815*** | (2016.01) |
| ***G06F 12/1009*** | (2016.01) |
| ***G06F 12/1027*** | (2016.01) |
| ***G06T 1/20*** | (2006.01) |
| ***G06T 1/60*** | (2006.01) |

(52) U.S. Cl.
CPC ...... *G06F 12/0815* (2013.01); *G06F 12/1009* (2013.01); *G06F 12/1027* (2013.01); *G06T 1/20* (2013.01); *G06T 1/60* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 11,954,026 | B1 * | 4/2024 | Kaplan | G06F 12/1009 |
| 2007/0057957 | A1 * | 3/2007 | Wooten | G06F 12/1009 345/568 |
| 2016/0283396 | A1 * | 9/2016 | Ter-Grigoryan | G06F 12/1009 |
| 2024/0045802 | A1 * | 2/2024 | Swaine | G06F 12/08 |
| 2024/0330205 | A1 * | 10/2024 | Moyes | G06F 12/1408 |
| 2025/0103492 | A1 * | 3/2025 | Feero | G06F 12/0813 |

* cited by examiner

*Primary Examiner* — Kaushikkumar M Patel
(74) *Attorney, Agent, or Firm* — Lowenstein Sandler LLP

(57) ABSTRACT

A first virtual address is translated into a first physical address using a first translation agent associated with a first I/O device of a system. The first physical address is associated with an address space of the first I/O device. A first address translation request is sent to a second translation agent associated with a CPU of the system. The first address translation request includes the first physical address. A first address translation response is received from the second translation agent. The first address translation response includes a second physical address. The second physical address is associated with an address space of the system.

17 Claims, 11 Drawing Sheets

ADDRESS TRANSLATION SERVICES TO ENABLE MEMORY COHERENCE

RELATED APPLICATIONS

This application claims the benefit of U.S. Provisional Patent Application No. 63/566,139 filed Mar. 15, 2024, the entire contents of which are incorporated by reference herein.

FIELD OF THE INVENTION

Embodiments of the present disclosure generally relate to Address Translation Services (ATS). Specifically, embodiments of the present disclosure relate to systems and methods for ATS to enable memory coherence.

BACKGROUND

Parallel processing in high-performance computing (HPC) systems involves the simultaneous execution of multiple computational tasks or operations. This is done by breaking down larger computations into smaller, independent subtasks that may be processed concurrently by multiprocessors. In some instances, parallel processing involves distributed computing such that tasks are distributed across multiple computing clusters. Each cluster may operate independently, and communication can be facilitated to share results. HPC systems often utilize a virtual memory system to provide a larger and more flexible address space to applications. Virtual addresses can be mapped using Address Translation Services (ATS). Address translation services include mechanisms and processes used in computer systems to translate virtual addresses into physical addresses.

DETAILED DESCRIPTION

Figure 1:
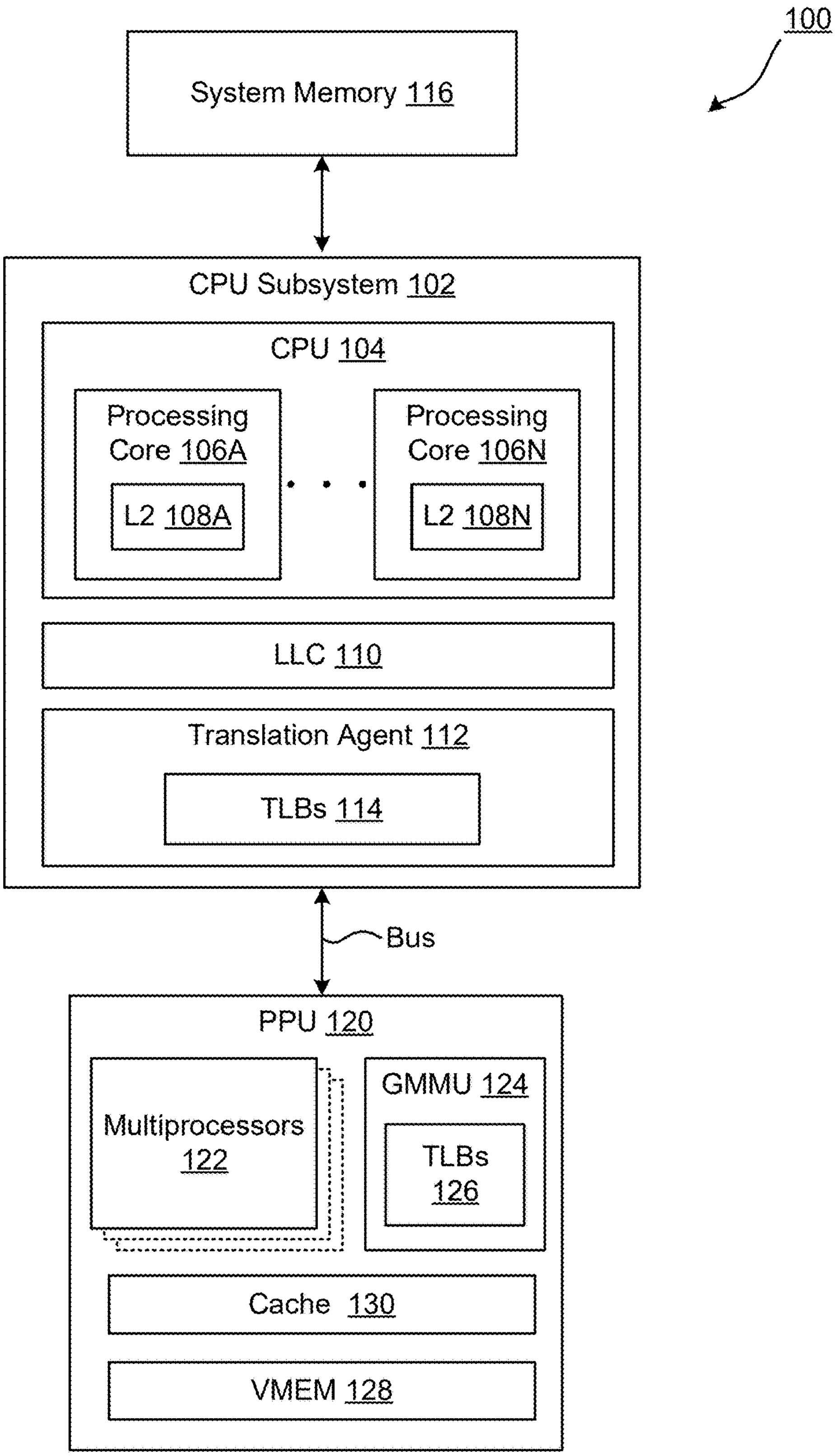
FIG. 1 is a block diagram illustrating a computer system configured to implement one or more aspects of the present disclosure.

In various computer systems, Input/Output (I/O) devices communicate over a network fabric such as a Peripheral Component Interconnect (PCI) or PCI-Express (PCIE). Such I/O devices may include, for example, Field-Programmable Gate Array (FPGA) accelerators, Network Interface Cards (NICs), and Graphics Processing Units (GPUs).

To support memory coherency between a host central processing unit (CPU) subsystem and one or more physical I/O devices, such as one or more GPUs of a system, a CPU subsystem and one or more GPUs may work within the same system physical address (SPA) space. An SPA space refers to the range of physical addresses that a system can utilize to access main memory, such as system memory associated with the CPU subsystem, a memory on peripheral devices, etc. Address Translation Services (ATS) may be implemented to ensure that the CPU subsystem, the GPU, and other Input/Output (I/O) devices have an unambiguous view of SPAs. As used herein, an SPA can generally refer to the final, translated physical address. In some conventional systems, an I/O device, such as a GPU, obtains an SPA using a request/response process. For example, the GPU can provide a Virtual Address (VA) as part of an Address Translation Request (ATR) packet to obtain an associated SPA. The CPU subsystem can obtain the associated SPA using a translation agent such as an input/output memory mapping unit (IOMMU) within the CPU subsystem that contains VA (also referred to as Input/Output Virtual Address (IOVA) herein) to SPA mappings. The CPU subsystem can provide the SPA as part of a response to the GPU, and GPU caches can be tagged with the SPA. In some instances, identifiers such as process address space ID (PASID) are used for specifying the address to be translated as belonging to the virtual address space of a specific process, such as (in the case of virtualization) a virtualized I/O device or a virtual machine (VM). Accordingly, such an address translation scheme is referred to as PASID ATS herein.

PASID ATS, in addition to one or more other features not described herein, can enable hardware cache coherency between the CPU and the GPU. For example, the GPU can use SPAs as tags through its caches to ensure a consistent view of memory across GPU caches and CPU caches, thereby enabling CPU-GPU coherency. However, PASID ATS fails to enable GPU-specific optimizations provided by GPU page tables as VAs are directly translated to SPAs via the IOMMU without utilizing GPU page tables, such as those provided by a GMMU. Resultantly, PASID ATS can fail to provide support for memory compression, GPU work creation, various surface formats, and various address types (e.g., Fabric Linear Addresses (FLA), Memory-Mapped I/O (MMIO) addresses, and the like) as attributes that enable such support are stored within GMMU page tables.

In some conventional systems, an I/O device, such as a GPU, can translate between a VA and its own internal address, such as a GPU physical address (GPA) using a GMMU within the GPU. In such a translation scheme, the GPA associated with the GPU may also be an SPA associated with the CPU as there is only one stage of address translation. While such an address translation scheme can enable the above-described GPU-specific optimization associated with GMMU attributes, it may nevertheless fail to maintain memory security as memory is completely managed by the GPU. As used herein, GPA can generally refer to the address space resulting from GMMU translation. By this definition, a GPA in some cases may be equivalent to an SPA or an IOVA, as described herein.

Aspects and implementations of the present disclosure address the above deficiencies and other deficiencies of conventional address translation services by serially performing address translation. To serially perform address translation, the system may provide I/O devices with the ability to translate VAs into GPU physical addresses/guest physical addresses (GPAs) and a translation agent, such as an IOMMU associated with the CPU of the system, to translate GPAs into SPAs. GPAs can also be referred to as GPU physical addresses or, from the perspective of the CPU subsystem, IOVAs.

For example, a GPU of the system may translate a VA into a GPA using a translation agent associated with the GPU, such as a GMMU. In some embodiments, the GPU can perform the address translation using a received page directory base (PDB) identifier. A unique PDB identifier can be assigned (e.g., by a hypervisor, by an Operating System (OS), etc.) and can serve as a context identifier. The GPU may use the PDB identifier to determine a top level of page tables to translate the VA to the GPA. In some embodiments, the GPU may determine additional attributes stored in the GMMU page table that enable GPU-specific features. Responsive to determining that the GPA is associated with system memory, the GPU may send an ATS request to the CPU to translate the GPA to an SPA. Because process information associated with the PDB identifier has been used by the GMMU, the ATS request can be sent to an IOMMU associated with the CPU without an associated PASID. Accordingly, the address translation scheme may also be referred to as non-PASID ATS herein.

In response to receiving the ATS request with a GPA from the GMMU, the CPU subsystem may translate the GPA (the IOVA from the perspective of the CPU subsystem) to an SPA using a translation agent, such as an IOMMU. The IOMMU can send an ATS response including the SPA to the GPU. The GPU can cache the SPA in one or more of its TLBs for subsequent memory requests and/or use the SPA for tagging GPU caches. In some embodiments, the ATS response can be merged with one or more GMMU attributes produced during the GMMU walk described above.

Advantages of the technology disclosure herein include, but are not limited to, enabling bi-directional CPU-GPU coherency with an unambiguous view of SPAs, as the GPU can cache SPAs in its TLBs. Additionally, the ATS scheme described herein can enable system-wide atomic support for GPU atomics. Further, bandwidth issues associated with IOMMU translation at the CPU subsystem can be avoided by caching SPAs in GPU TLBs. Further still, the GPU can use the SPA returned from the ATS response and GPU attributes obtained from GMMU address translation to obtain benefits associated with PASID ATS and provide GPU-specific optimizations using the obtained GMMU attributes.

FIG. 1 is a block diagram illustrating a computer system 100 configured to implement one or more aspects of the present disclosure. In some embodiments, system 100 includes interconnected hardware devices, whereas in other embodiments, system 100 may be an exemplary System-on-Chip (SoC). In at least one embodiment, devices of the computer system 100 may be interconnected with proprietary interconnects, standardized interconnects (e.g., PCI or PCIe), or a combination thereof. In at least one embodiment, devices of the computer system 100 may be interconnected with a Chip-to-Chip (C2C) or chip-to-package interconnect. The computer system 100 includes a Central Processing Unit (CPU) subsystem 102 and a system memory 116 that are interconnected using an interface. The interface additionally connects the CPU subsystem 102 and system memory 116 to a fabric to which several I/O devices/peripheral devices are also connected.

The CPU subsystem 102 can include a CPU 104 including one or more processing cores 106A through 106N (referred to generally as "processing cores 106" herein), a Last Level Cache (LLC) 110, and a translation agent 112 including one or more TLBs 114. Each of the processing cores 106 may be individual processing units within the CPU 104 that independently execute instructions. Each processing core 106 may be a complete processing unit with its own arithmetic logic units (ALUs), control units, registers, and other components necessary to execute program instructions. In some embodiments, the translation agent 112 may be a memory management unit (MMU), which translates between virtual addresses used by the CPU 104 and SPAs. The translation agent 112 may access page tables to determine a translation for a given virtual address. TLBs 114 may store recently accessed virtual-to-physical mappings. Each processing core may have dedicated caches (e.g., L1, L2 108A through 108N, etc.) and may further have access to the system caches, such as the LLC 110. In some embodiments, the CPU 104 can run a program such as a program that starts on system boot, an operating system, or a device driver that manages the allocation of the fabric resources and peripheral device configuration in the system 100.

The system 100 includes CPU subsystem 102 coupled with one or more I/O devices that perform various tasks for the system 100. In the present example, the I/O devices connecting to the fabric may include one or more parallel processing units (PPUs), such as PPU 120. In some embodiments, the one or more I/O devices may include an accelerator or other co-processor that is implemented in a Field-Programmable Gate Array (FPGA) (not illustrated) and attached to the bus.

The PPU 120 may include one or more multiprocessor(s) 122, a Graphics Memory Management Unit (GMMU) 124, one or more Translation Lookaside Buffers (TLBs) 126, a cache 130, and a video memory (VMEM) 128. Each multiprocessor 122, for example, may be a streaming multiprocessor (SM), a compute unit (CU), a many integrated core (MIC), and the like. Each multiprocessor 122 may be responsible for executing parallel processing tasks, which involve performing the same operation on multiple pieces of data concurrently. Each multiprocessor 122 can execute a certain number of threads simultaneously such that the PPU 120, as a whole, can execute a large number of threads concurrently across all multiprocessors 122.

It is appreciated that the system 100 illustrated herein is illustrative and that variations and modifications are possible. The connection topology, the number of CPUs 104 within the CPU subsystem 102, the number of PPUs 120, the number of processing cores 106 within the CPU 104, and the number of multiprocessors 122 within the PPU 120 may be modified as desired. Additionally, the particular components illustrated herein are not exhaustive; for example, any number of add-in cards, peripheral devices, switches, network adapters, and the like might be supported but are not illustrated herein.

In at least one embodiment, the PPU 120 is a graphics processor with rendering pipelines that can be configured to perform various tasks related to generating pixel data from graphics data supplied by the CPU subsystem 102 and/or system memory 116. In operation, the CPU 104 is the central processor of computer system 100, controlling and coordinating operations of other system components. In particular, the CPU 104 may issue commands that control the operation of the PPU 120.

In at least one embodiment, the PPU 120 may incorporate circuitry optimized for graphics and video processing, including, for example, video output circuitry, and constitutes a graphics processing unit (GPU). In another embodiment, the PPU 120 incorporates circuitry optimized for general purpose processing, while preserving the underlying computational architecture. The PPU 120 further may include a video memory (VMEM) 128 that the PPU 120 may use to store necessary data such as textures, frame buffers, shaders, and other graphical elements. In at least one embodiment, the VMEM 128 can include various types of memory devices, including dynamic random-access memory (DRAM) or graphics random-access memory such as video random-access memory (VRAM) or synchronous graphics random-access memory (SGRAM), including graphics double data rate (GDDR) SGRAM. In at least one embodiment, the VMEM 128 can include one or more stacks of memory, such as multiple DRAM dies stacked vertically, to form a high bandwidth memory (HBM). It is appreciated that the specific implementation of the VMEM 128 can vary and can be selected from one of many available designs.

The VMEM 128 may be addressed according to SPAs. In some embodiments, the PPU 120 includes a graphics memory management unit (GMMU) 124 for translating between virtual addresses used by applications and GPAs. One or more engines (e.g., compute, graphics, CopyEngine, video engine, etc.) associated with the PPU 120 or virtual machines (VMs) may be virtually addressed and make requests using virtual addresses. The GMMU 124 may translate virtual addresses received from applications into GPAs. In at least one embodiment, when the aperture is VMEM 128 and virtualization is disabled, GMMU 124 may produce a GPA that is equivalent to an SPA due to (1) the possible GPA range falling under a block of address (e.g., 512 GB) and the GPU being assigned an SPA block whose size is equal to or bigger than the GPA range and (2) the GPA being padded on top by address bits above the SPA block of this GPU for coherence purposes. In at least one embodiment, when the aperture is VMEM 128 and virtualization is enabled, GMMU 124 produces a GPA that is an intermediate physical address, which further may be translated by a Virtual Memory Management Unit (VMMU) to obtain an SPA.

The GMMU 124 may include one or more Translation Lookaside Buffers (TLBs) 126. The TLBs 126 may store cache lines containing multiple Page Table Entries (PTEs), some of which may be valid and some of which may be invalid. The PTEs may maintain translations between virtual addresses and GPAs or translations between virtual addresses and system physical addresses (SPAs) obtained from the CPU subsystem 102. A GPU engine may make a translation request with a virtual address space. The request can be received by one or more local TLBs and sent downward through a GMMU TLB hierarchy of TLBs 126 (e.g., an L2 TLB or hub TLB). If the translation request misses on the TLBs 126, a page walk may be performed on the GMMU 124 to fetch a GMMU PTE that includes the address to be translated. Each valid GMMU PTE may include an independent GPA address and a set of GMMU attributes associated with the page. These GPAs may be translated further by the CPU subsystem 102 using the ATS techniques described herein.

The GMMU 124 may send an Address Translation Request (ATR) to the translation agent 112 to translate a GPA to a System Physical Address (SPA) associated with the CPU subsystem 102. In some embodiments, the translation agent constitutes an Input/Output Memory Management Unit (IOMMU) or a System Memory Management Unit (SMMU). In some embodiments, the GMMU 124 may provide translation context information to the translation agent 112 via a Bus/Device/Function (BDF) field conveyed in the ATR. In some embodiments, the BDF field is an N-bit identifier in an ATR including identifiers associated with the bus, device, and function of the ATR. It can be noted that from the perspective of the translation agent 112, the GPA received with the ATR may be perceived as a virtual address. Accordingly, a GPA may also be referred to as an Input/Output Virtual Address (IOVA).

Translation agent 112 may translate device-generated addresses (e.g., GPAs/IOVAs) to SPAs. An SPA is a fully resolved physical address used in reference to a system address map. The translation agent 112 can be configured and initialized by an Operating System (OS) or, in the case of virtualization, a hypervisor. In some embodiments, the translation agent 112 may employ one or more TLBs 114 to cache recently used translations. If the translation is not found in one or more TLBs 114 associated with the translation agent 112, the translation agent 112 may initiate a page walk to retrieve the translation from system memory 116. The translation agent 112 can accordingly use ATS protocol so caches in the PPU 120 can be tagged with SPAs, thereby enabling full coherence between the CPU subsystem 102 and the PPU 120. The translation agent 112 may provide an address translation response to the PPU 120 including the translated SPA. The GMMU 124 may cache the received SPA in TLBs 126, use the SPA for tagging caches to enable full coherence, and merge the SPA with GMMU attributes such that GMMU 124 PTEs contain SPA translations and a set of GMMU 124 attributes.

In some embodiments, the translation agent 112 may include features to support virtualization, allowing multiple virtual machines to run on the physical system 100 while maintaining isolation between their memory spaces and the I/O device they access. In such an embodiment, the translation agent 112 may perform multiple stages of address translation. For example, at a first stage, the translation agent 112 may perform a GPA/IOVA to an Intermediate Physical Address (IPA) translation, programmed by the guest or process. At a second stage, the translation agent may perform an IPA to SPA translation, programmed by a hypervisor.

Figure 2:
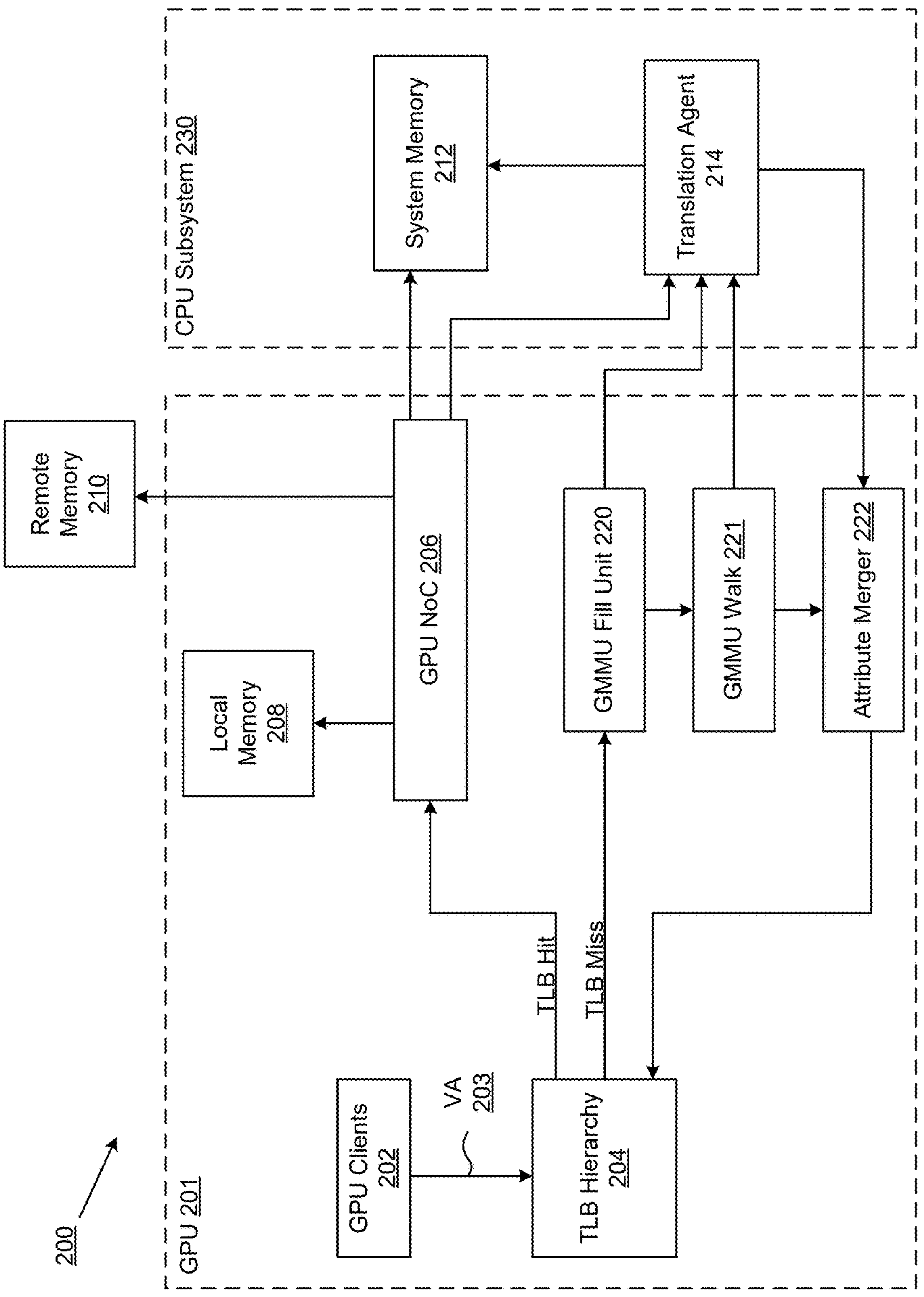
FIG. 2 is an example diagram depicting address translation operations to enable memory coherence, in accordance with at least one embodiment of the present disclosure.

FIG. 2 is an example diagram 200 depicting address translation operations to enable memory coherence, in accordance with at least one embodiment of the present disclosure. Diagram 200 can include similar elements illustrated by computing system 100, as described with respect to FIG. 1. It should be noted that elements of FIG. 1 can be used herein to help describe FIG. 2. The operations described with respect to FIG. 2 are shown to be performed serially for sake of illustration, rather than limitation. Although shown in a particular sequence or order, unless otherwise specified, the order of operations can be modified. Thus, the illustrated embodiments should be understood only as examples, and the illustrated operations can be performed in a different order, while some operations can be performed in parallel. Additionally, one or more operations can be omitted in at least one embodiment. Thus, not all illustrated operations are required in every embodiment, and other process flows are possible. In at least one embodiment, the same, different, fewer, or greater operations can be performed. In at least one embodiment, one or more operations depicted in FIG. 2 can be performed by PPU 120 or by CPU subsystem 102 of FIG. 1. In at least one embodiment, one or more operations depicted in FIG. 2 can be performed by a general CPU(s) or GPU(s) based on instructions generated by a software such as an operating system (OS) or a hypervisor managing and allocating hardware resources.

The diagram 200 includes a GPU 201 and a CPU subsystem 230 communicating via an interface such as a C2C interface, PCIe interface or the like. In at least one embodiment, GPU 201 can correspond to PPU 120 of FIG. 1. In at least one embodiment, CPU subsystem 230 can correspond to CPU subsystem 102 of FIG. 1. The diagram 200 illustrates a system including GPU 201 with a dedicated local memory 208. In at least one embodiment, aspects and implementations of the present disclosure can be applied to a unified memory system (e.g., an SoC) such that the GPU 201 does not include a dedicated local memory 208.

The diagram 200 includes one or more GPU clients 202 of GPU 201. One or more GPU clients 202 may request access to memory resources using a virtual address (VA) 203. In at least one embodiment, the one or more GPU clients 202 can include applications or processes associated with the GPU 201, such as PPU 120 of FIG. 1, for computation and rendering tasks. In some embodiments, GPU 201 clients can also include a virtual machine (VM) or a specific application running within a VM that utilizes GPU resources. Virtualization can allow multiple VMs to share the same physical hardware, such as GPU 201, and each VM can act as an independent GPU client, making use of resources provided by the host system.

A TLB hierarchy 204 can receive the memory request from a GPU client 202 including VA 203. VA 203 can be a Guest Virtual Address (GVA) associated with a VM or a GPU Virtual Address associated with the GPU 201. Accordingly, VA 203 can also be referred to as a GVA 203 herein. In at least one embodiment, the TLB hierarchy 204 can include one or more TLBs (e.g., L1 TLB, L2 TLB, etc.) associated with a GPU 201 Memory Management Unit (GMMU). For example, TLB hierarchy 204 can include TLB 126 of FIG. 1. TLB hierarchy 204 can store cache lines containing multiple Page Table Entries (PTEs). The PTEs may maintain translations between VAs, GPAs, and SPAs. Each valid GMMU PTE can additionally include an independent GPA address and a set of GMMU attributes associated with the page. The request can be sent downward through TLB hierarchy 204. If the request hits on the TLB hierarchy 204, the process flow can continue to GPU NoC 206. If the request misses on the TLB hierarchy 204, the process flow can continue to GMMU fill unit 220.

If the request hits on the TLB hierarchy 204, the physical address retrieved from the associated PTE can be sent to GPU Network-on-Chip (NoC) 206. In at least one embodiment, the TLB hierarchy 204 can also provide translation context information to GPU NoC 206 using Bus/Device/Function (BDF) identifiers. The BDF can identify the source of the request. For example, the BDF can be mapped (e.g., using a mapping table, using one or more integer constants, etc.) to a GPU Function Identifier (GFID) associated with the GPU and/or a guest identifier associated with the requesting VM. In at least one embodiment, PTEs of the TLB hierarchy 204 can include BDF identifiers including GFIDs. GFIDs can be used to identify function numbers of Address Translation Requests (ATRs) and memory requests as they flow through the diagram 200. In at least one embodiment, the GFIDs can be encoded PCIe function numbers that identify a physical function (physical device), or a virtual function (virtual machine) associated with the ATR/memory request. GFID, GVA, a valid bit, an address type identifier, and other identifiers used in connection with an ATR/memory request may be included within a PTE, as illustrated below with respect to FIG. 3.

The GPU NoC 206 can be a network-on-chip architecture within the GPU. Specifically, the GPU NoC 206 is a communication infrastructure connecting various components (e.g., functional block, processing units, memory, etc.) within a chip. For example, the GPU NoC 206 can facilitate communication between different memories, such as a local memory 208, remote memory 210, and system memory 212. The GPU NoC 206 can retrieve data from local memory 208, remote memory 210, or system memory 212 based on the type of physical address received from the TLB hierarchy 204. In at least one embodiment, the GPU NoC 206 can decode the physical address to determine whether it is associated with local memory 208, remote memory 210 (or any other memory associated with a remote I/O device), or system memory 212.

For example, the GPU NoC 206 can receive a physical address from the TLB hierarchy 204 and decode the physical address to determine it is a SPA associated with a local I/O device, such as GPU 201, that is a part of the system. Responsive to the determination that the physical address is an SPA associated with local memory, the GPU NoC 206 can retrieve data associated with the SPA from the local memory 208. In some embodiments, the local memory 208 can be a video memory that is a part of the system, such as VMEM 128.

In another example, the GPU NoC 206 can receive a physical address from the TLB hierarchy 204, decode the physical address, and determine that the physical address is associated with a remote device, such as a remote GPU. For example, the physical address can be a GPA associated with remote memory 210 or a Fabric Linear Address (FLA) of remote memory 210 associated with a remote I/O device. A remote I/O device, such as a remote GPU, can be a peer GPU that is physically separate from a system that includes GPU 201 and CPU subsystem 230. The GPU NoC 206 can retrieve data associated with the GPA/FLA directly from the remote memory 210. In at least one embodiment, the GPU NoC 206 can perform memory access to remote memory 210 through standardized and/or C2C interconnects, such as a high-speed GPU-GPU NVLINK-C2C interconnect. As such, data can be retrieved directly from the remote memory 210 without involvement of a host CPU, such as CPU 104. In an illustrative example, the GPU NoC 206 can send a request that is addressed using an FLA to the remote GPU. The remote GPU can perform GMMU translation, and optionally ATS translation, to determine a SPA and route the request to the correct memory destination. Since the remote GPU has the SPA address for the request, it can be coherently cached if desired.

In yet another example, the GPU NoC 206 can receive a physical address from the TLB hierarchy 204 and decode the physical address to determine that it is associated with a system memory 212. In at least one embodiment, the system memory 212 can correspond to system memory 116 associated with CPU subsystem 102 of FIG. 1. Responsive to a determination that the received physical address is a SPA associated with system memory 212, the GPU NoC 206 can retrieve the data directly from system memory 212 using the SPA. Responsive to a determination that the physical address is a GPA, the GPU NoC 206 can send the physical address to the translation agent 214 for inline address translation of the received physical address to an SPA.

If the request from GPU client 202 misses on the TLB hierarchy 204, virtual address 203 can be sent to GMMU fill unit 220. Responsive to a determination that PASID ATS is enabled (e.g., via software), the GMMU fill unit 220 may send an ATR including virtual address 203 and a PASID associated with the virtual address 203 to the translation agent 214. In some embodiments, a given virtual address space can have (1) a GMMU mapping followed by a non-PASID ATS mapping and/or (2) a PASID ATS mapping. Unless configured otherwise by software, when the request from GPU client 202 misses on the TLB hierarchy 204, both types of translations may be attempted.

A page walk may be performed on a GMMU of the GPU 201 to fetch a GMMU PTE that maps a range of virtual addresses that includes the VA 203 to be translated. Each valid GMMU PTE may include an independent GPA address and a set of GMMU attributes associated with the page. The VA 203 to GPA translation can be retrieved from a GMMU PTE. In at least one embodiment, the GMMU walk can be performed on a page table indicated by a page directory base (PDB) identifier. A unique PDB identifier can be assigned (e.g., by a hypervisor, by an OS, etc.) to a Virtual Machine (VM) using the GPU and/or engines of the GPU issuing address translation requests. PDBs can serve as context identifiers. When an I/O device or VM generates a memory request, the PDB identifier and the VA 203 may be included in the request. The GMMU may use a PDB identifier to determine a page table within the GMMU to translate the VA 203 to the GPA.

The GPA and associated GMMU attributes can be sent to attribute merger 222. Additionally, if non-PASID ATS is enabled (e.g., via software), the translated GPA (IOVA from the perspective of the translation agent 214) and an associated BDF identifier can be sent to the translation agent 214.

In at least one embodiment, the translation agent 214 can directly translate VA 203 to an SPA according to PASID ATS techniques. In at least one embodiment, translation agent 214 can translate the GPA produced as a result of the GMMU walk 221 to an SPA using one or more stages of address translation. For example, the translation agent 214 can receive a BDF and a GPA from a GMMU with an indication that non-PASID ATS is enabled. The translation agent 214 can use one or more fields of BDF to select a translation context. For example, translation agent 214 may use one or more fields of the BDF to determine a page table within the translation agent 214 to translate the GPA to an SPA.

In response to translating a GPA to an SPA, the translation agent 214 can provide the SPA in an ATS response, such as a standard protocol packet, to the attribute merger 222. The attribute merger 222 can merge GMMU attributes determined by GMMU walk 221 with the SPA received from the translation agent 214 into a merged response. The final translated SPA can be stored in TLB entries of the TLB hierarchy 204. The final translated SPA can be the result of serial GMMU translation and one or more stages of translation by the translation agent 214. Because of the serialized nature of the translation, entries in TLB hierarchy 204 are merged from GMMU attributes and translation agent 214 PTEs. GMMU attributes can include aperture types that indicate a type and/or location of memory being accessed, an attribute that indicates whether requests are cached in the GPU 201, and the like. GMMU attributes may also include attributes that control data compression and data format. Additionally, GMMU attributes may include page permissions such as a permission indicating whether an atomic request is allowed.

GPU 201 can cache the VA 203 to SPA translation in TLB hierarchy 204 and use the SPA in GPU caches (e.g., L1 cache, L2 cache, L3 cache, etc.) to enable bidirectional coherency between GPU 201 caches and CPU subsystem 230 caches. Additionally, the SPA can be cached and associated with received GMMU attributes that can be utilized to enable memory coherence, system atomics, memory compression, and other GPU-specific optimizations.

When a page in memory is unmapped, a corresponding PTE in the TLB hierarchy 204 describing the mapping can be updated to mark the PTE as invalid. After a PTE is marked as invalid, any TLB in the TLB hierarchy 204 that may have a cached copy of the translation can also be invalidated. Invalidation is considered complete when all TLB cache lines corresponding to the invalidated virtual address are removed and there are no in-flight instructions using an address obtained from the invalidated PTE. In at least one embodiment, invalidations can be performed at varying scopes. For example, the system may invalidate any TLB entry containing a certain virtual address, such as VA 203; the system can invalidate all TLB entries within a range of virtual addresses; the system may invalidate an entire context or function; and the system can invalidate all TLBs. When invalidating PTEs according to one or more VAs, TLB entries can be invalidated by comparing PTE tags as PTEs are tagged with VAs.

In at least one embodiment, invalidation can be supported at each level of translation (e.g., GMMU translation, and one or more levels of translation performed by translation agent 214). When page tables are nested using multiple translation stages, TLBs at each translation stage do not contain the intermediate translations. In such an instance, invalidations at a lower level of the page table hierarchy require invalidations for all upper nested levels to ensure no invalid translations remain that span the lower translation stages. The invalidation at the lower level can be targeted, since the range of virtual addresses at that level is known. However, the virtual addresses used to tag the TLBs in the higher level will be unknown to the lower level (hypervisor or kernel driver) performing the invalidation, so the upper level invalidates may be global invalidates of the entire context or function using a GFID, a PASID, and/or a PDB.

Figure 3:
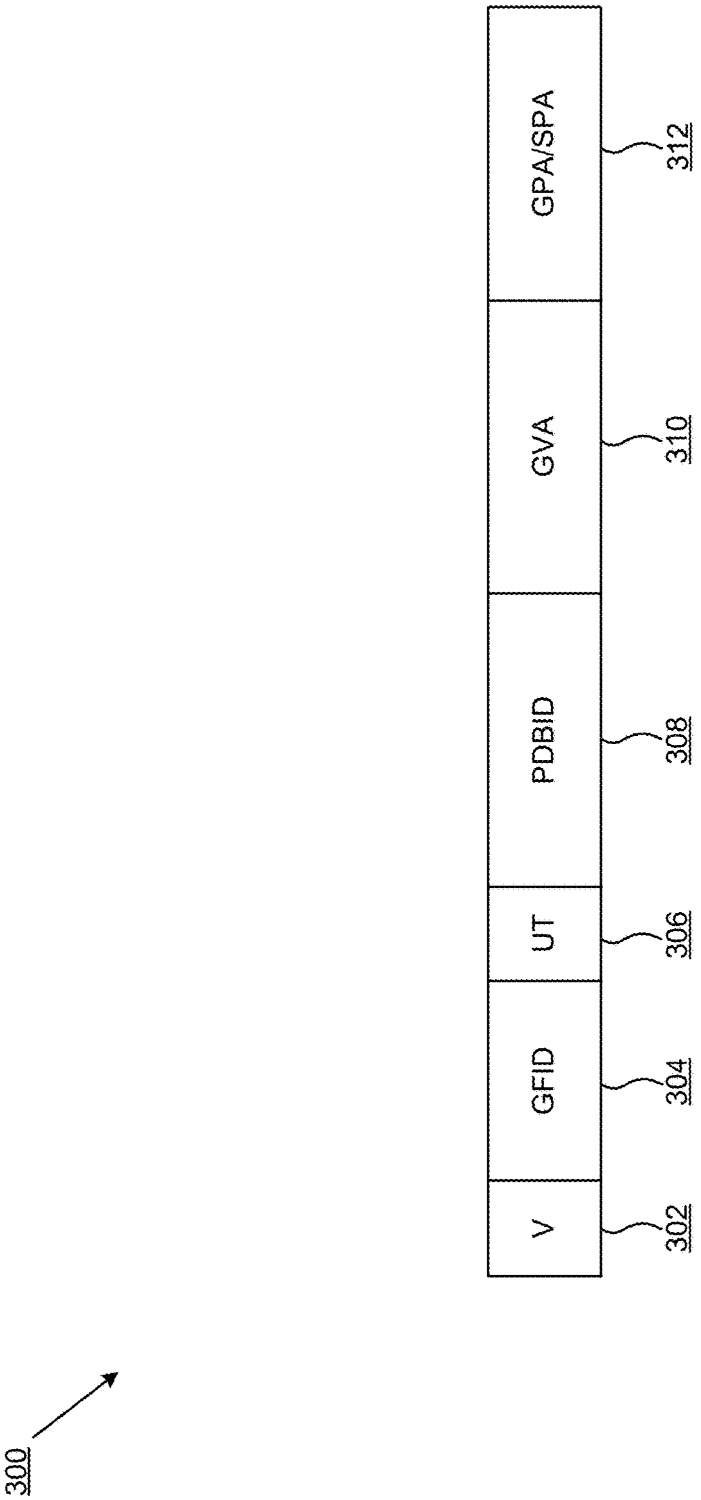
FIG. 3 illustrates an example of a Page Table Entry (PTE) to enable address translation operations described herein, in accordance with at least one embodiment of the present disclosure.

FIG. 3 illustrates an example of a Page Table Entry (PTE) 300 to enable address translation operations described herein, in accordance with at least one embodiment of the present disclosure. For example, PTE 300 can include a tag for a PTE in TLB hierarchy 204 of FIG. 2. Specifically, PTE 300 includes a field 302 for a valid bit (V). If the field 302 indicates that the PTE 300 is invalid, address translation can cease, and a fault can be caused at a client request. PTE 300 can include a field 304 for a GPU Function Identifier (GFID) that identifies a GPU and/or a guest (e.g., a VM) associated with a client request. PTE 300 includes a field 306 for an untranslated (UT) indicator that indicates whether the associated physical address is a translated SPA.

The PTE 300 includes a field 308 for a Page Directory Based Identifier (PDBID). The PDBID is a unique identifier assigned by GMMU hardware. If PASID ATS applies (e.g., PASID ATS is enabled) GMMU hardware uses PDB and the PASID to assign PDBID. In the case of non-PASID ATS, GMMU hardware may use the PDB alone to assign the PDBID. The PTE 300 includes a field 310 for a GVA. The GVA can be referred to as a GPU virtual address, or a guest virtual address associated with a VM. For example, field 310 can store VA 203 of FIG. 2.

In some embodiments, PTE 300 can include one or more fields corresponding to non-tag attributes. In the illustrated example, PTE 300 includes a field 312 for a corresponding GPA or SPA. For example, field 312 can store a GPA corresponding to the GVA stored in field 310 or an SPA corresponding to the GVA stored in field 310. In some embodiments, PTE 300 can include one or more additional fields corresponding to non-tag attributes such as compression enable, volatile, aperture, and the like.

Figure 4:
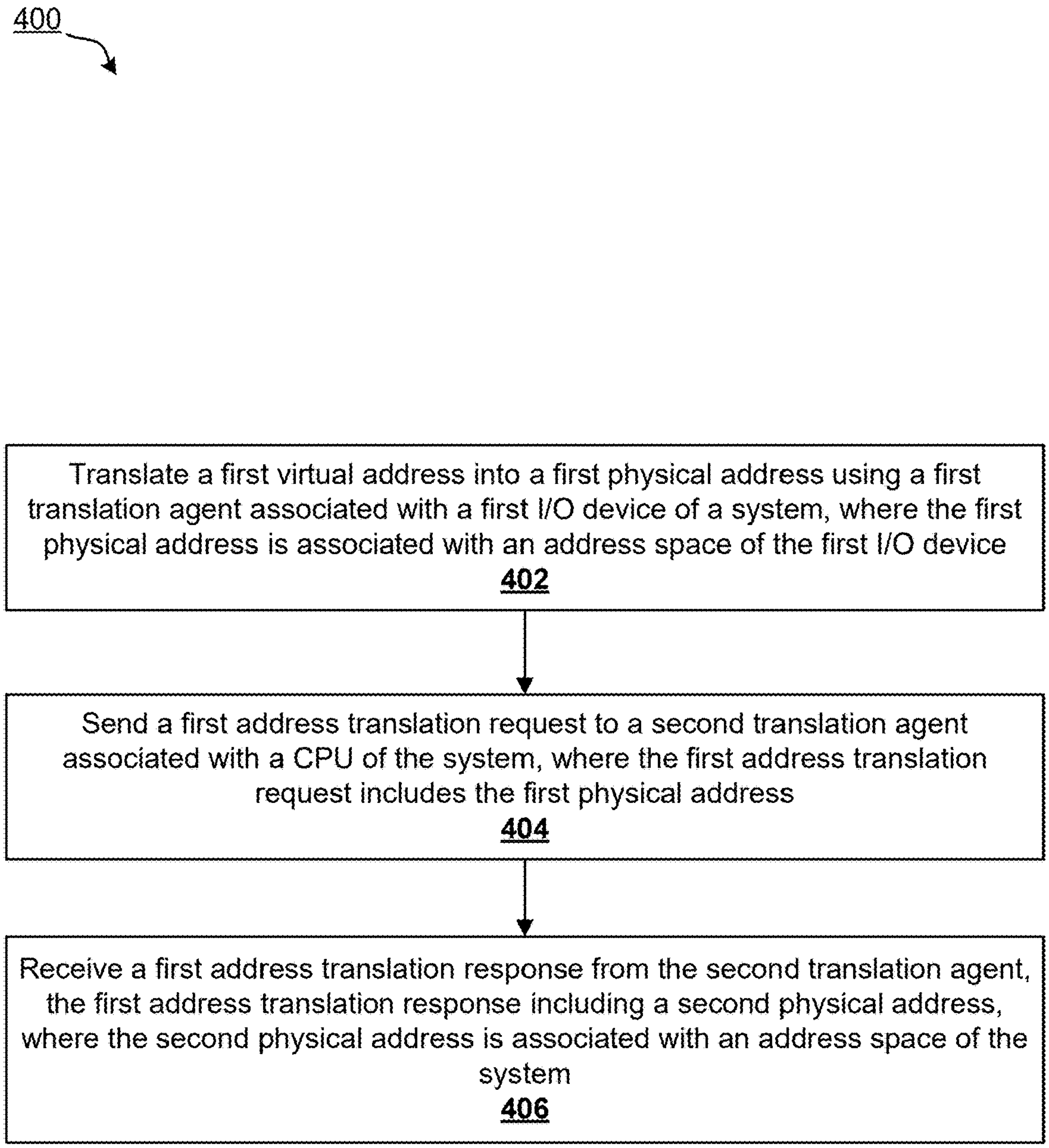
FIG. 4 illustrates a flowchart of a method for address translation services to enable memory coherence, in accordance with at least one embodiment of the present disclosure.

FIG. 4 illustrates a flowchart of a method for address translation services to enable memory coherence, in accordance with at least one embodiment of the present disclosure. Although method 400 is described in the context of a processing unit, the method 400 may also be performed by a program, custom circuitry, or by a combination of custom circuitry and a program. For example, the method 400 may be executed by an I/O device, a GPU (graphics processing unit), a CPU (central processing unit), or any processor capable of virtual addressing. Furthermore, persons of ordinary skill in the art will understand that any system that performs method 400 is within the scope and spirit of embodiments of the present invention.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 402 of method 400, processing circuitry can translate a first virtual address (VA), such as VA 203 of FIG. 2, into a first physical address using a first translation agent associated with a first I/O device of a system. In at least one embodiment, the first I/O device can be a GPU and the first translation agent can be a GMMU. For example, the first I/O device can be the GPU 201 of FIG. 2 and the first physical address can be a GPA associated with the GPU 201. The first translation agent can be the GMMU 124 of FIG. 1. In at least one embodiment, to translate the first VA into the first physical address using the first translation agent, the processing circuitry can identify a page table of the first translation agent using a page directory base (PDB) identifier, where the page table serves a VM of the system as indicated by the PDB identifier; and translate the virtual address into the first physical address using the identified page table.

At operation 404 of method 400, the processing circuitry can send a first address translation request (ATR) to a second translation agent associated with a CPU of the system, such as CPU 104 of system 100 illustrated with respect to FIG. 1. For example, the second translation agent can correspond to translation agent 112 of FIG. 1 or translation agent 214 of FIG. 2. The first address translation request can include the first physical address. In at least one embodiment, the second translation agent can include an IOMMU. In at least one embodiment, the first ATR is sent to the second translation agent in response to a determination that the first physical address is associated with a system memory of the CPU.

At operation 406 of method 400, the processing circuitry can receive a first address translation response from the second translation agent. The first address translation response includes a second physical address. The second physical address is associated with an address space of the system. For example, the second physical address can be aN SPA. In at least one embodiment, the first I/O device includes a cache, and the processing circuitry may use the second physical address as a tag within the cache. In at least one embodiment, the cache of the first I/O device is coherent with one or more caches of the CPU. In an illustrative example, the processing circuitry can cache a translated SPA in one or more TLBs 126 of the PPU 120 or within the cache hierarchy 204 of the GPU 201.

In at least one embodiment, the processing logic can merge the first address translation response with one or more attributes obtained by the first translation agent, wherein the first address translation response further includes one or more attributes obtained from the second translation agent. In at least one embodiment, the system includes a second I/O device coupled with the first I/O device via a chip-to-chip (C2C) interconnect. In at least one embodiment, the processing logic can translate a second virtual address into a fabric linear address (FLA) using the first translation agent. The processing logic can determine that the FLA is associated with the second I/O device, wherein the second I/O device is a remote I/O device. The processing logic can send a second address translation request to the second I/O device, where the second address translation request contains the FLA. The processing logic can receive a second address translation response from the second I/O device, the second address translation response comprising data associated with the FLA.

Parallel Processing Architecture

Figure 5:
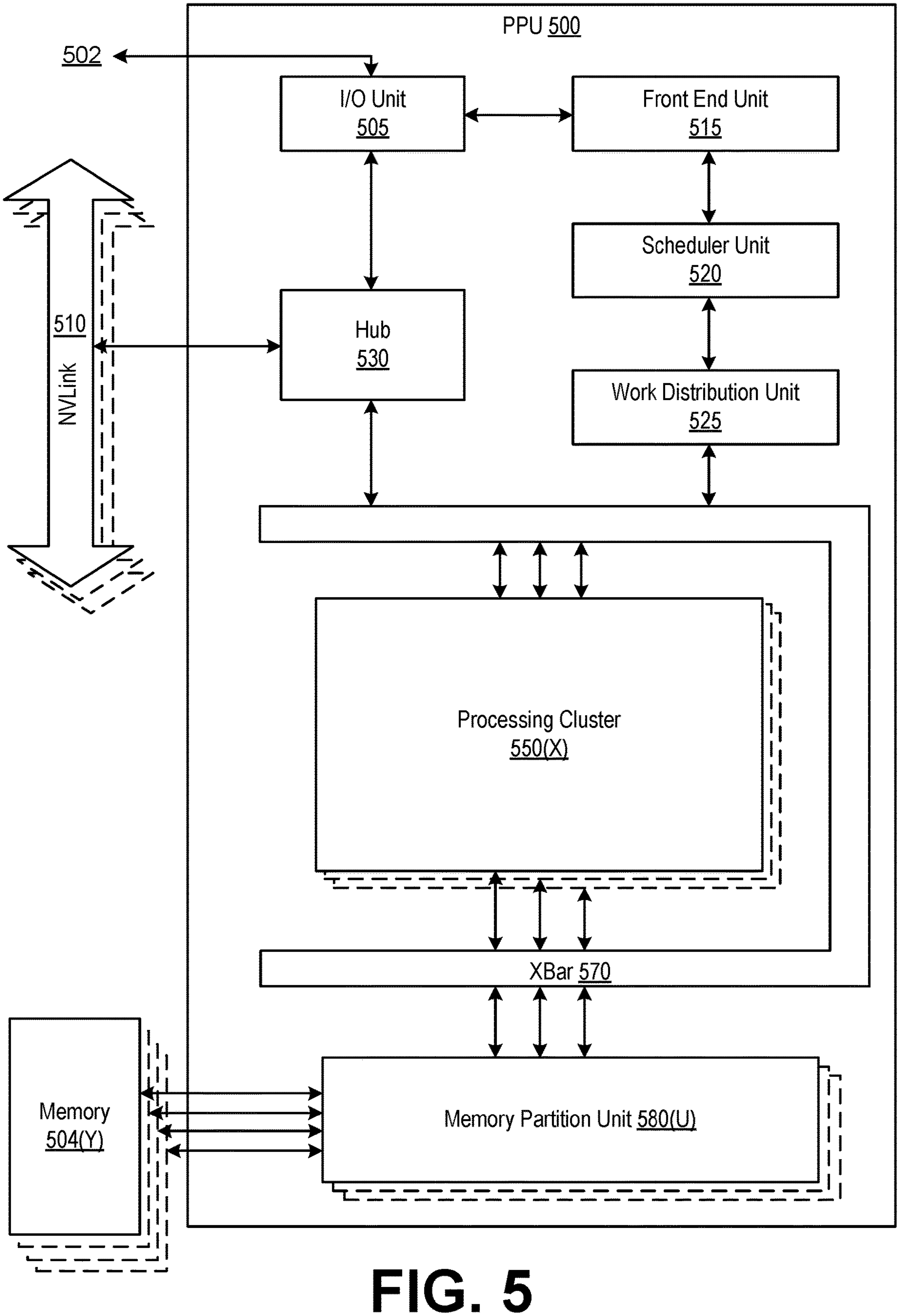
FIG. 5 illustrates a parallel processing unit, in accordance with at least one embodiment of the present disclosure.

FIG. 5 illustrates a parallel processing unit (PPU) 500, in accordance with an embodiment. In an embodiment, the PPU 500 is a multi-threaded processor that is implemented on one or more integrated circuit devices. The PPU 500 is a latency hiding architecture designed to process many threads in parallel. A thread (e.g., a thread of execution) is an instantiation of a set of instructions configured to be executed by the PPU 500. In an embodiment, the PPU 500 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 500 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 500 may be configured to accelerate thousands of High-Performance Computing (HPC), data center, and machine learning applications. The PPU 500 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 5, the PPU 500 includes an Input/Output (I/O) unit 505, a front-end unit 515, a scheduler unit 520, a work distribution unit 525, a hub 530, a crossbar (Xbar) 570, one or more processing clusters 550 (e.g., general processing clusters (GPCs)), and one or more partition units 580. The PPU 500 may be connected to a host processor or other PPUs 500 via one or more high-speed NVLink 510 interconnects. The PPU 500 may be connected to a host processor or other peripheral devices via an interconnect 502. The PPU 500 may also be connected to a local memory comprising a number of memory devices 504. In an embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 510 interconnect enables systems to scale and include one or more PPUs 500 combined with one or more CPUs, supports cache coherence between the PPUs 500 and CPUs, and CPU mastering. Data and/or commands may be transmitted by the NVLink 510 through the hub 530 to/from other units of the PPU 500 such as one or more copy engines, a video encoder, a video decoder, a power management unit, etc. (not explicitly shown). The NVLink 510 is described in more detail in conjunction with FIG. 7B.

The I/O unit 505 is configured to transmit and receive communications (e.g., commands, data, etc.) from a host processor (not shown) over the interconnect 502. The I/O unit 505 may communicate with the host processor directly via the interconnect 502 or through one or more intermediate devices such as a memory bridge. In an embodiment, the I/O unit 505 may communicate with one or more other processors, such as one or more of the PPUs 500 via the interconnect 502. In an embodiment, the I/O unit 505 implements a Peripheral Component Interconnect Express (PCIe) interface for communications over a PCIe bus and the interconnect 502 is a PCIe bus. In alternative embodiments, the I/O unit 505 may implement other types of well-known interfaces for communicating with external devices.

The I/O unit 505 decodes packets received via the interconnect 502. In an embodiment, the packets represent commands configured to cause the PPU 500 to perform various operations. The I/O unit 505 transmits the decoded commands to various other units of the PPU 500 as the commands may specify. For example, some commands may be transmitted to the front-end unit 515. Other commands may be transmitted to the hub 530 or other units of the PPU 500 such as one or more copy engines, a video encoder, a video decoder, a power management unit, etc. (not explicitly shown). In other words, the I/O unit 505 is configured to route communications between and among the various logical units of the PPU 500.

In an embodiment, a program executed by the host processor encodes a command stream in a buffer that provides workloads to the PPU 500 for processing. A workload may comprise several instructions and data to be processed by those instructions. The buffer is a region in a memory that is accessible (e.g., read/write) by both the host processor and the PPU 500. For example, the I/O unit 505 may be configured to access the buffer in a system memory connected to the interconnect 502 via memory requests transmitted over the interconnect 502. In an embodiment, the host processor writes the command stream to the buffer and then transmits a pointer to the start of the command stream to the PPU 500. The front-end unit 515 receives pointers to one or more command streams. The front-end unit 515 manages the one or more streams, reading commands from the streams and forwarding commands to the various units of the PPU 500.

The front-end unit 515 is coupled to a scheduler unit 520 that configures the various processing clusters 550 to process tasks defined by the one or more streams. The scheduler unit 520 is configured to track state information related to the various tasks managed by the scheduler unit 520. The state may indicate which processing cluster 550 a task is assigned to, whether the task is active or inactive, a priority level associated with the task, and so forth. The scheduler unit 520 manages the execution of a plurality of tasks on the one or more processing clusters 550.

The scheduler unit 520 is coupled to a work distribution unit 525 that is configured to dispatch tasks for execution on the processing clusters 550. The work distribution unit 525 may track a number of scheduled tasks received from the scheduler unit 520. In an embodiment, the work distribution unit 525 manages a pending task pool and an active task pool for each of the processing clusters 550. The pending task pool may comprise a number of slots (e.g., 32 slots) that contain tasks assigned to be processed by a particular processing cluster 550. The active task pool may comprise a number of slots (e.g., 4 slots) for tasks that are actively being processed by the processing clusters 550. As a processing cluster 550 finishes the execution of a task, that task is evicted from the active task pool for the processing cluster 550 and one of the other tasks from the pending task pool is selected and scheduled for execution on the processing cluster 550. If an active task has been idle on the processing cluster 550, such as while waiting for a data dependency to be resolved, then the active task may be evicted from the processing cluster 550 and returned to the pending task pool while another task in the pending task pool is selected and scheduled for execution on the processing cluster 550.

The work distribution unit 525 communicates with the one or more processing clusters 550 via XBar 570. The XBar 570 is an interconnect network that couples many of the units of the PPU 500 to other units of the PPU 500. For example, the XBar 570 may be configured to couple the work distribution unit 525 to a particular processing cluster 550. Although not shown explicitly, one or more other units of the PPU 500 may also be connected to the XBar 570 via the hub 530.

The tasks are managed by the scheduler unit 520 and dispatched to a processing cluster 550 by the work distribution unit 525. The processing cluster 550 is configured to process the task and generate results. The results may be consumed by other tasks within the processing cluster 550, routed to a different processing cluster 550 via the XBar 570, or stored in the memory 504. The results can be written to the memory 504 via the partition units 580, which implement a memory interface for reading and writing data to/from the memory 504. The results can be transmitted to another PPU 500 or CPU via the NVLink 510. In an embodiment, the PPU 500 includes a number U of partition units 580 that is equal to the number of separate and distinct memory devices 504 coupled to the PPU 500. A partition unit 580 will be described in more detail below in conjunction with FIG. 6B.

In an embodiment, a host processor executes a driver kernel that implements an application programming interface (API) that enables one or more applications executing on the host processor to schedule operations for execution on the PPU 500. In an embodiment, multiple compute applications are simultaneously executed by the PPU 500 and the PPU 500 provides isolation, quality of service (QoS), and independent address spaces for the multiple compute applications. An application may generate instructions (e.g., API calls) that cause the driver kernel to generate one or more tasks for execution by the PPU 500. The driver kernel outputs tasks to one or more streams being processed by the PPU 500. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 7A.

Figure 6A:
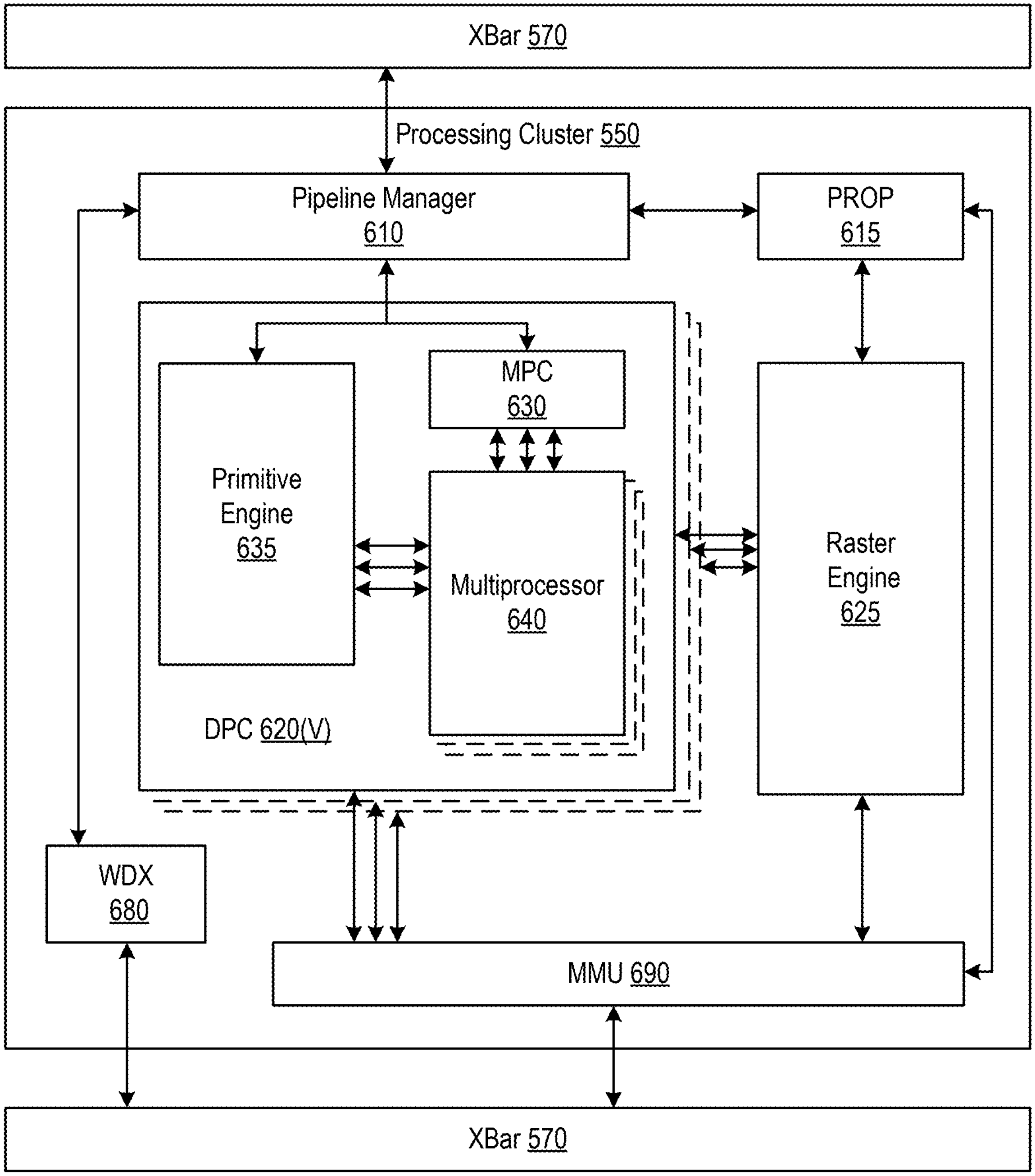
FIG. 6A illustrates a general processing cluster within the parallel processing unit of FIG. 5, in accordance with at least one embodiment of the present disclosure.

FIG. 6A illustrates a processing cluster 550 of the PPU 500 of FIG. 5, in accordance with an embodiment. As shown in FIG. 6A, each processing cluster 550 includes a number of hardware units for processing tasks. In an embodiment, each processing cluster 550 includes a pipeline manager 610, a pre-raster operations unit (PROP) 615, a raster engine 625, a work distribution crossbar (WDX) 680, a memory management unit (MMU) 690, and one or more Data Processing Clusters (DPCs) 620. It will be appreciated that the processing cluster 550 of FIG. 6A may include other hardware units in lieu of or in addition to the units shown in FIG. 6A.

In an embodiment, the operation of the processing cluster 550 is controlled by the pipeline manager 610. The pipeline manager 610 manages the configuration of the one or more DPCs 620 for processing tasks allocated to the processing cluster 550. In an embodiment, the pipeline manager 610 may configure at least one of the one or more DPCs 620 to implement at least a portion of a graphics rendering pipeline. For example, a DPC 620 may be configured to execute a vertex shader program on the programmable multiprocessor 640. Multiprocessors 640 may generally include streaming multiprocessors, compute units, many integrated cores, and the like. The pipeline manager 610 may also be configured to route packets received from the work distribution unit 525 to the appropriate logical units within the processing cluster 550. For example, some packets may be routed to fixed function hardware units in the PROP 615 and/or raster engine 625 while other packets may be routed to the DPCs 620 for processing by the primitive engine 635 or the multiprocessor 640. In an embodiment, the pipeline manager 610 may configure at least one of the one or more DPCs 620 to implement a neural network model and/or a computing pipeline.

Figure 6B:
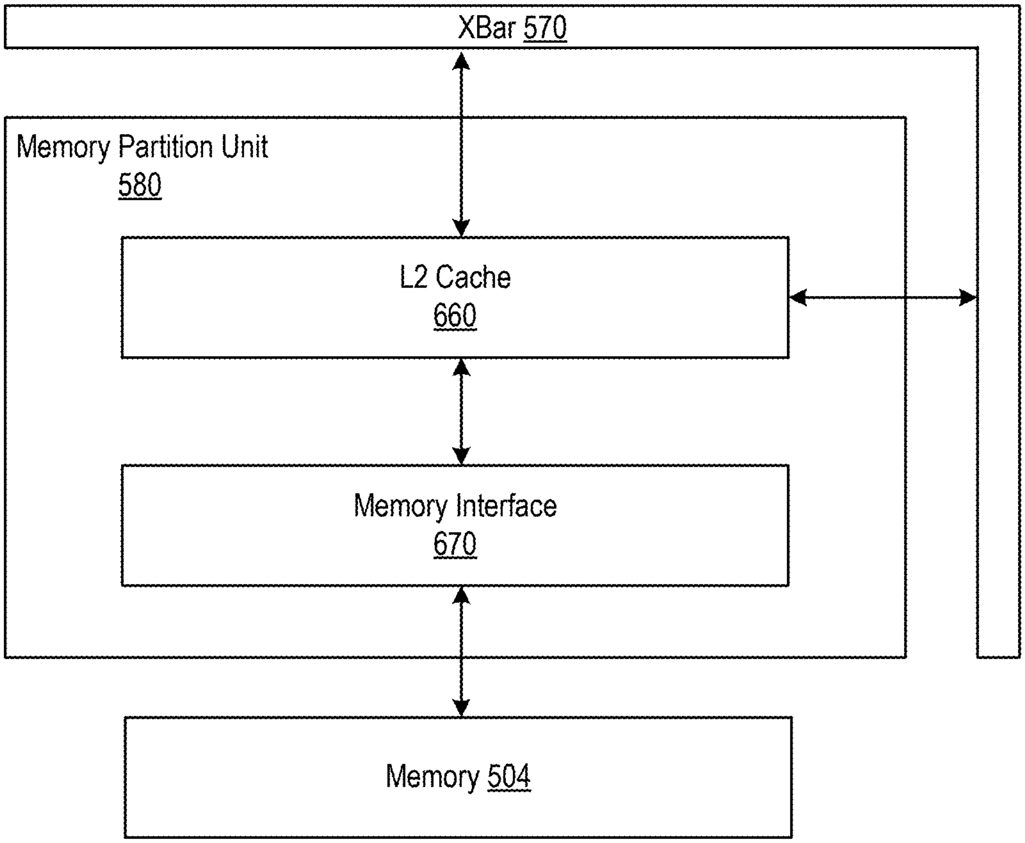
FIG. 6B illustrates a memory partition unit of the parallel processing unit of FIG. 5, in accordance with at least one embodiment of the present disclosure.

The PROP unit 615 is configured to route data generated by the raster engine 625 and the DPCs 620 to a Raster Operations (ROP) unit, described in more detail in conjunction with FIG. 6B. The PROP unit 615 may also be configured to perform optimizations for color blending, organize pixel data, perform address translations, and the like.

The raster engine 625 includes a number of fixed function hardware units configured to perform various raster operations. In an embodiment, the raster engine 625 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 625 comprises fragments to be processed, for example, by a fragment shader implemented within a DPC 620.

Each DPC 620 included in the processing cluster 550 includes an M-Pipe Controller (MPC) 630, a primitive engine 635, and one or more Multiprocessors 640. The MPC 630 controls the operation of the DPC 620, routing packets received from the pipeline manager 610 to the appropriate units in the DPC 620. For example, packets associated with a vertex may be routed to the primitive engine 635, which is configured to fetch vertex attributes associated with the vertex from the memory 504. In contrast, packets associated with a shader program may be transmitted to the multiprocessor 640.

In some embodiments, the multiprocessor 640 comprises a programmable multiprocessor, such as a programmable streaming multiprocessor, that is configured to process tasks represented by a number of threads. Each multiprocessor 640 is multi-threaded and configured to execute a plurality of threads (e.g., 32 threads) from a particular group of threads concurrently. In an embodiment, the multiprocessor 640 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the multiprocessor 640 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The multiprocessor 640 will be described in more detail below in conjunction with FIG. 7A.

The MMU 690 provides an interface between the processing cluster 550 and the partition unit 580. The MMU 690 may provide translation of virtual addresses into physical addresses, memory protection, and arbitration of memory requests. In an embodiment, the MMU 690 provides one or more translation lookaside buffers (TLBs) for performing translation of virtual addresses into physical addresses in the memory 504.

FIG. 6B illustrates a memory partition unit 580 of the PPU 500 of FIG. 5, in accordance with an embodiment. As shown in FIG. 6B, the memory partition unit 580 includes a level two (L2) cache 660, and a memory interface 670. The memory interface 670 is coupled to the memory 504. Memory interface 670 may implement 32, 64, 128, or 1024-bit data buses, or the like, for high-speed data transfer. In an embodiment, the PPU 500 incorporates U memory interfaces 670, one memory interface 670 per pair of partition units 580, where each pair of partition units 580 is connected to a corresponding memory device 504. For example, PPU 500 may be connected to up to Y memory devices 504, such as high bandwidth memory stacks or graphics double-data-rate, version 5, synchronous dynamic random-access memory, or other types of persistent storage.

In an embodiment, the memory interface 670 implements an HBM2 memory interface and Y equals half U. In an embodiment, the HBM2 memory stacks are located on the same physical package as the PPU 500, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 504 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 500 process very large datasets and/or run applications for extended periods.

In an embodiment, the PPU 500 implements a multi-level memory hierarchy. In an embodiment, the memory partition unit 580 supports a unified memory to provide a single unified virtual address space for CPU and PPU 500 memory, enabling data sharing between virtual memory systems. In an embodiment, the frequency of accesses by a PPU 500 to memory located on other processors is traced to ensure that memory pages are moved to the physical memory of the PPU 500 that is accessing the pages more frequently. In an embodiment, the NVLink 510 supports address translation services allowing the PPU 500 to directly access a CPU's page tables and providing full access to CPU memory by the PPU 500.

In an embodiment, copy engines transfer data between multiple PPUs 500 or between PPUs 500 and CPUs. The copy engines can generate page faults for addresses that are not mapped into the page tables. The memory partition unit 580 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 504 or other system memory may be fetched by the memory partition unit 580 and stored in the L2 cache 660, which is located on-chip and is shared between the various processing clusters 550. As shown, each memory partition unit 580 includes a portion of the L2 cache 660 associated with a corresponding memory device 504. Lower-level caches may then be implemented in various units within the processing clusters 550. For example, each of the multiprocessors 640 may implement a level one (L1) cache. The L1 cache is private memory that is dedicated to a particular multiprocessor 640. Data from the L2 cache 660 may be fetched and stored in each of the L1 caches for processing in the functional units of the Multiprocessors 640. The L2 cache 660 is coupled to the memory interface 670 and the XBar 570.

Figure 7A:
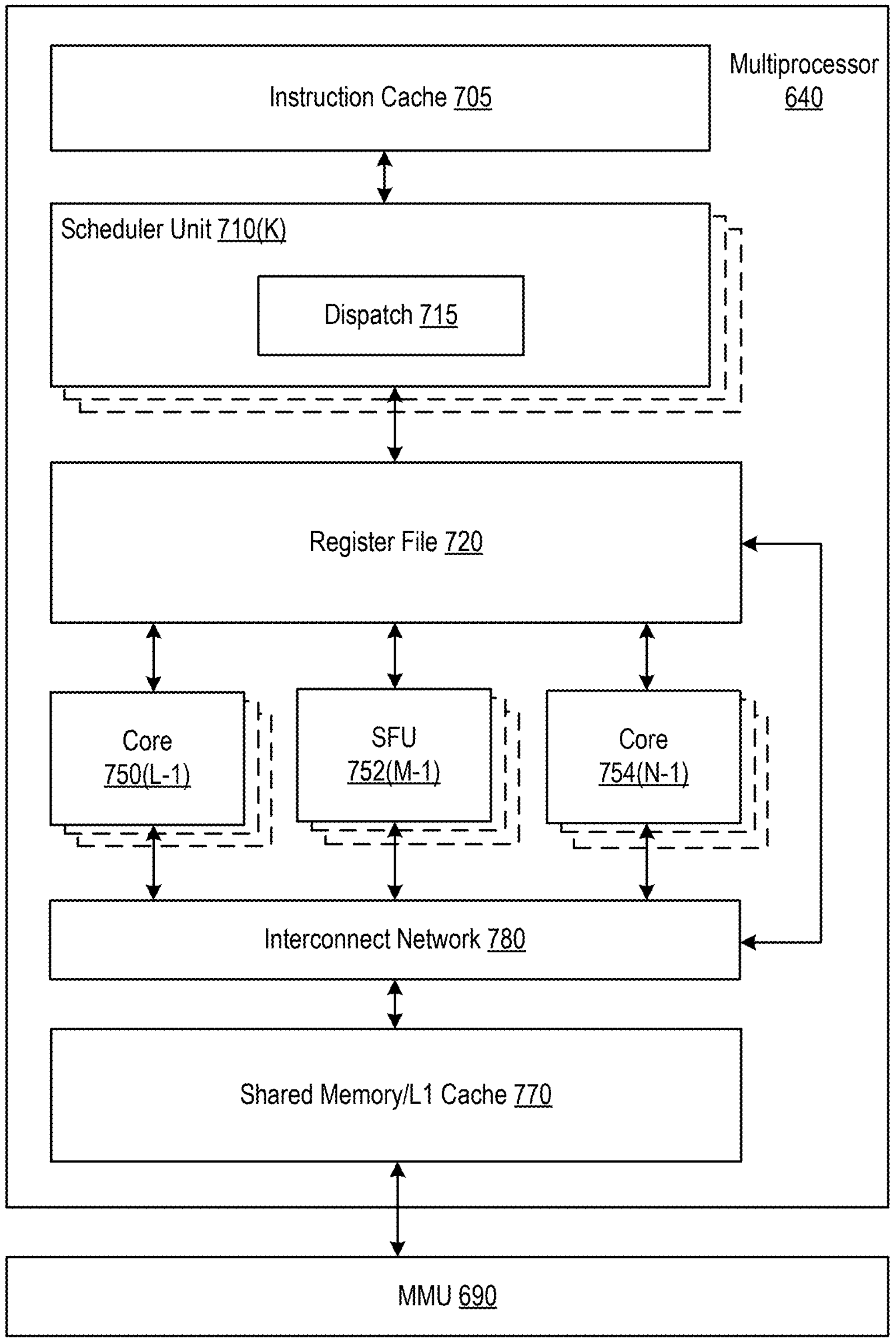
FIG. 7A illustrates the streaming multi-processor of FIG. 6A, in accordance with at least one embodiment of the present disclosure.

FIG. 7A illustrates the multiprocessor 640 of FIG. 6A, in accordance with an embodiment. As shown in FIG. 7A, the multiprocessor 640 includes an instruction cache 705, one or more scheduler units 710, a register file 720, one or more processing cores 750, one or more special function units (SFUs) 752, one or more load/store units (LSUs) 754, an interconnect network 780, a shared memory/L1 cache 770.

As described above, the work distribution unit 525 dispatches tasks for execution on the processing clusters 550 of the PPU 500. The tasks are allocated to a particular DPC 620 within a processing cluster 550 and, if the task is associated with a shader program, the task may be allocated to a multiprocessor 640. The scheduler unit 710 receives the tasks from the work distribution unit 525 and manages instruction scheduling for one or more thread blocks assigned to the multiprocessor 640. The scheduler unit 710 schedules thread blocks for execution as warps of parallel threads, where each thread block is allocated at least one warp. In an embodiment, each warp executes 32 threads. The scheduler unit 710 may manage a plurality of different thread blocks, allocating the warps to the different thread blocks and then dispatching instructions from the plurality of different cooperative groups to the various functional units (e.g., cores 750, SFUs 752, and LSUs 754) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 715 is configured to transmit instructions to one or more of the functional units. In the embodiment, the scheduler unit 710 includes two dispatch units 715 that enable two different instructions from the same warp to be dispatched during each clock cycle. In alternative embodiments, each scheduler unit 710 may include a single dispatch unit 715 or additional dispatch units 715.

Each multiprocessor 640 includes a register file 720 that provides a set of registers for the functional units of the multiprocessor 640. In an embodiment, the register file 720 is divided between each of the functional units such that each functional unit is allocated a dedicated portion of the register file 720. In another embodiment, the register file 720 is divided between the different warps being executed by the multiprocessor 640. The register file 720 provides temporary storage for operands connected to the data paths of the functional units.

Each multiprocessor 640 comprises L processing cores 750. In an embodiment, the multiprocessor 640 includes a large number (e.g., 128, etc.) of distinct processing cores 750. Each core 750 may include a fully-pipelined, single-precision, double-precision, and/or mixed precision processing unit that includes a floating-point arithmetic logic unit and an integer arithmetic logic unit. In an embodiment, the floating-point arithmetic logic units implement the IEEE 754-2008 standard for floating point arithmetic. In an embodiment, the cores 750 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 750. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each multiprocessor 640 also comprises M SFUs 752 that perform special functions (e.g., attribute evaluation, reciprocal square root, and the like). In an embodiment, the SFUs 752 may include a tree traversal unit configured to traverse a hierarchical tree data structure. In an embodiment, the SFUs 752 may include a texture unit configured to perform texture map filtering operations. In an embodiment, the texture units are configured to load texture maps (e.g., a 2D array of texels) from the memory 504 and sample the texture maps to produce sampled texture values for use in shader programs executed by the multiprocessor 640. In an embodiment, the texture maps are stored in the shared memory/L1 cache 770. The texture units implement texture operations such as filtering operations using mip-maps (e.g., texture maps of varying levels of detail). In an embodiment, each multiprocessor 640 includes two texture units.

Each multiprocessor 640 also comprises N LSUs 754 that implement load and store operations between the shared memory/L1 cache 770 and the register file 720. Each multiprocessor 640 includes an interconnect network 780 that connects each of the functional units to the register file 720 and the LSU 754 to the register file 720 and shared memory/L1 cache 770. In an embodiment, the interconnect network 780 is a crossbar that can be configured to connect any of the functional units to any of the registers in the register file 720 and connect the LSUs 754 to the register file and memory locations in shared memory/L1 cache 770.

The shared memory/L1 cache 770 is an array of on-chip memory that allows for data storage and communication between the multiprocessor 640 and the primitive engine 635 and between threads in the multiprocessor 640. In an embodiment, the shared memory/L1 cache 770 comprises 128 KB of storage capacity and is in the path from the multiprocessor 640 to the partition unit 580. The shared memory/L1 cache 770 can be used to cache reads and writes. One or more of the shared memory/L1 cache 770, L2 cache 660, and memory 504 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 770 enables the shared memory/L1 cache 770 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 5, are bypassed, creating a much simpler programming model. In the general-purpose parallel computation configuration, the work distribution unit 525 assigns and distributes blocks of threads directly to the DPCs 620. The threads in a block execute the same program, using a unique thread ID in the calculation to ensure each thread generates unique results, using the multiprocessor 640 to execute the program and perform calculations, shared memory/L1 cache 770 to communicate between threads, and the LSU 754 to read and write global memory through the shared memory/L1 cache 770 and the memory partition unit 580. When configured for general purpose parallel computation, the multiprocessor 640 can also write commands that the scheduler unit 520 can use to launch new work on the DPCs 620.

The PPU 500 may be included in a desktop computer, a laptop computer, a tablet computer, servers, supercomputers, a smart phone (e.g., a wireless, hand-held device), personal digital assistant (PDA), a digital camera, a vehicle, a head mounted display, a hand-held electronic device, and the like. In an embodiment, the PPU 500 is embodied on a single semiconductor substrate. In another embodiment, the PPU 500 is included in a system-on-a-chip (SoC) along with one or more other devices such as additional PPUs 500, the memory 504, a reduced instruction set computer (RISC) CPU, a memory management unit (MMU), a digital-to-analog converter (DAC), and the like.

In an embodiment, the PPU 500 may be included on a graphics card that includes one or more memory devices 504. The graphics card may be configured to interface with a PCIe slot on a motherboard of a desktop computer. In yet another embodiment, the PPU 500 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 7B:
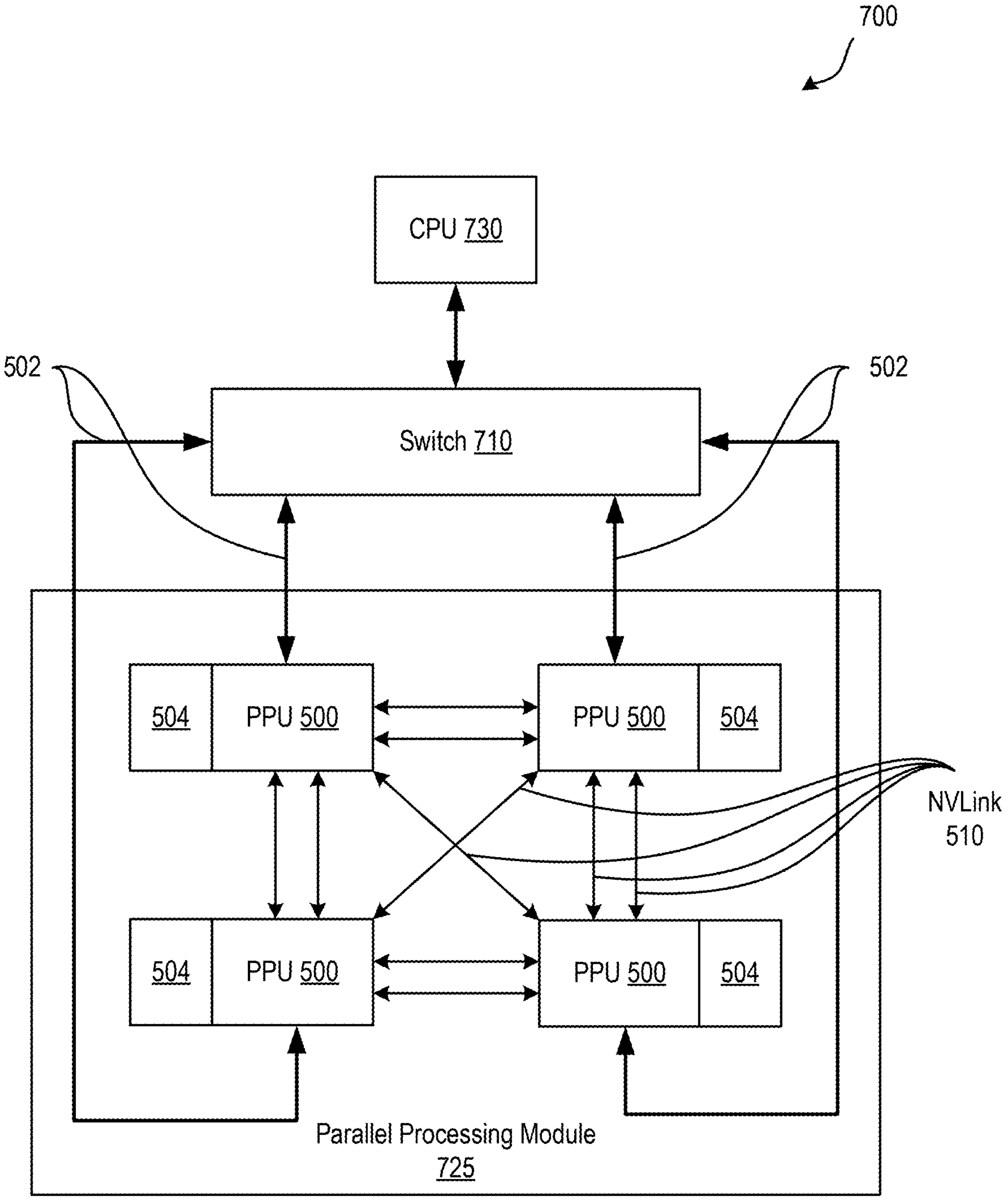
FIG. 7B is a conceptual diagram of a processing system implemented using the PPU of FIG. 5, in accordance with at least one embodiment of the present disclosure.

FIG. 7B is a conceptual diagram of a processing system 700 implemented using the PPU 500 of FIG. 5, in accordance with an embodiment. The processing system 700 may be configured to implement the method 400 shown in FIG. 4. The processing system 700 includes a CPU 730, switch 712, and multiple PPUs 500 each and respective memories 504. The NVLink 510 provides high-speed communication links between each of the PPUs 500. Although a particular number of NVLink 510 and interconnect 502 connections are illustrated in FIG. 7B, the number of connections to each PPU 500 and the CPU 730 may vary. The switch 712 interfaces between the interconnect 502 and the CPU 730. The PPUs 500, memories 504, and NVLinks 510 may be situated on a single semiconductor platform to form a parallel processing module 725. In an embodiment, the switch 712 supports two or more protocols to interface between various different connections and/or links.

In another embodiment (not shown), the NVLink 510 provides one or more high-speed communication links between each of the PPUs 500 and the CPU 730 and the switch 712 interfaces between the interconnect 502 and each of the PPUs 500. The PPUs 500, memories 504, and interconnect 502 may be situated on a single semiconductor platform to form a parallel processing module 725. In yet another embodiment (not shown), the interconnect 502 provides one or more communication links between each of the PPUs 500 and the CPU 730 and the switch 712 interfaces between each of the PPUs 500 using the NVLink 510 to provide one or more high-speed communication links between the PPUs 500. In another embodiment (not shown), the NVLink 510 provides one or more high-speed communication links between the PPUs 500 and the CPU 730 through the switch 712. In yet another embodiment (not shown), the interconnect 502 provides one or more communication links between each of the PPUs 500 directly. One or more of the NVLink 510 high-speed communication links may be implemented as a physical NVLink interconnect or either an on-chip or on-die interconnect using the same protocol as the NVLink 510.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 725 may be implemented as a circuit board substrate and each of the PPUs 500 and/or memories 504 may be packaged devices. In an embodiment, the CPU 730, switch 712, and the parallel processing module 725 are situated on a single semiconductor platform.

In an embodiment, the signaling rate of each NVLink 510 is 20 to 25 Gigabits/second and each PPU 500 includes six NVLink 510 interfaces (as shown in FIG. 7B, five NVLink 510 interfaces are included for each PPU 500). Each NVLink 510 provides a data transfer rate of 25 Gigabytes/second in each direction, with six links providing 500 Gigabytes/second. The NVLinks 510 can be used exclusively for PPU-to-PPU communication as shown in FIG. 7B, or some combination of PPU-to-PPU and PPU-to-CPU, when the CPU 730 also includes one or more NVLink 510 interfaces.

In an embodiment, the NVLink 510 allows direct load/store/atomic access from the CPU 730 to each PPU's 500 memory 504. In an embodiment, the NVLink 510 supports coherency operations, allowing data read from the memories 504 to be stored in the cache hierarchy of the CPU 730, reducing cache access latency for the CPU 730. In an embodiment, the NVLink 510 includes support for Address Translation Services (ATS), allowing the PPU 500 to directly access page tables within the CPU 730. One or more of the NVLinks 510 may also be configured to operate in a low-power mode.

Figure 7C:
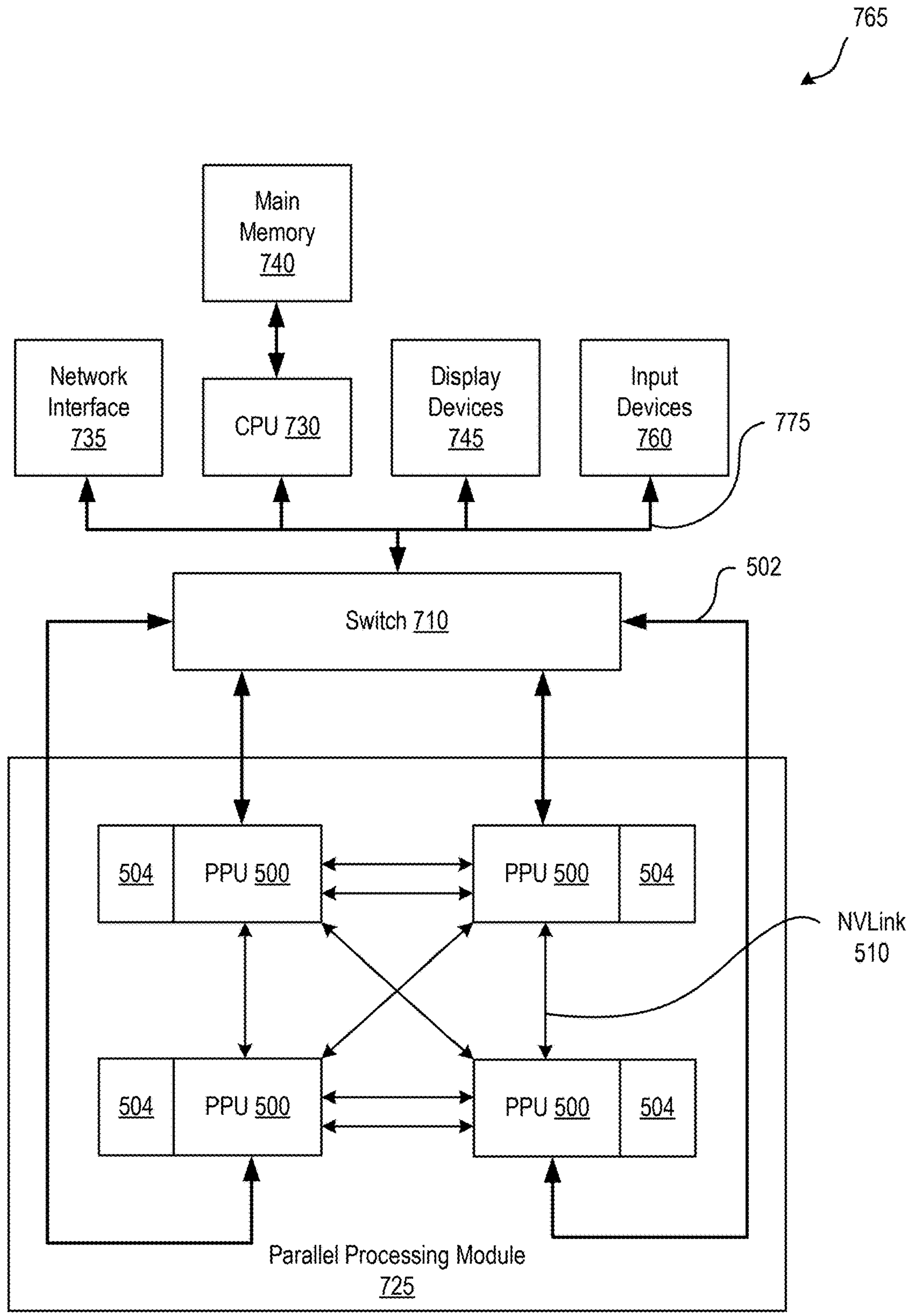
FIG. 7C illustrates an exemplary system in which the various architecture and/or functionality of the various previous embodiments may be implemented.

FIG. 7C illustrates an exemplary system 765 in which the various architecture and/or functionality of the various previous embodiments may be implemented. The exemplary system 765 may be configured to implement the method 400 shown in FIG. 4.

As shown, a system 765 is provided including at least one central processing unit 730 that is connected to a communication bus 775. The communication bus 775 may be implemented using any suitable protocol, such as PCI (Peripheral Component Interconnect), PCI-Express, AGP (Accelerated Graphics Port), HyperTransport, or any other bus or point-to-point communication protocol(s). The system 765 also includes a main memory 740. Control logic (software) and data are stored in the main memory 740 which may take the form of random-access memory (RAM).

The system 765 also includes input devices 760, the parallel processing system 725, and display devices 745, e.g., a conventional CRT (cathode ray tube), LCD (liquid crystal display), LED (light emitting diode), plasma display or the like. User input may be received from the input devices 760, e.g., keyboard, mouse, touchpad, microphone, and the like. Each of the foregoing modules and/or devices may even be situated on a single semiconductor platform to form the system 765. Alternately, the various modules may also be situated separately or in various combinations of semiconductor platforms per the desires of the user.

Further, the system 765 may be coupled to a network (e.g., a telecommunications network, local area network (LAN), wireless network, wide area network (WAN) such as the Internet, peer-to-peer network, cable network, or the like) through a network interface 735 for communication purposes.

The system 765 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 740 and/or the secondary storage. Such computer programs, when executed, enable the system 765 to perform various functions. The memory 740, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 765 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (e.g., pixel data for each of the pixels of the display).

An application writes model data for a scene (e.g., a collection of vertices and attributes) to a memory such as a system memory or memory 504. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the multiprocessors 640 of the PPU 500 including one or more of a vertex shader, hull shader, domain shader, geometry shader, and a pixel shader. For example, one or more of the multiprocessors 640 may be configured to execute a vertex shader program that processes a number of vertices defined by the model data. In an embodiment, the different multiprocessors 640 may be configured to execute different shader programs concurrently. For example, a first subset of multiprocessors 640 may be configured to execute a vertex shader program while a second subset of multiprocessors 640 may be configured to execute a pixel shader program. The first subset of multiprocessors 640 processes vertex data to produce processed vertex data and writes the processed vertex data to the L2 cache 660 and/or the memory 504. After the processed vertex data is rasterized (e.g., transformed from three-dimensional data into two-dimensional data in screen space) to produce fragment data, the second subset of multiprocessors 640 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 8:
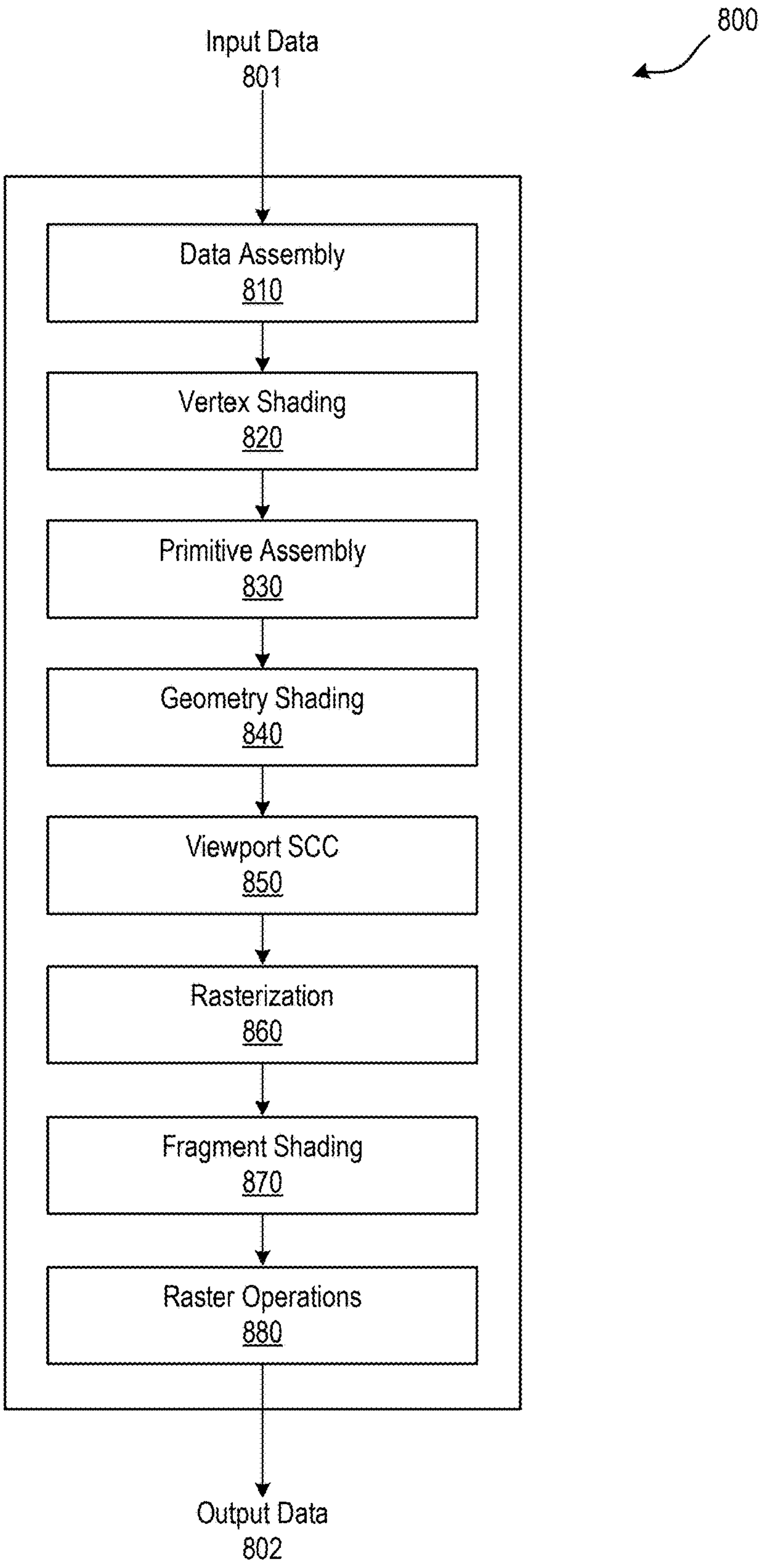
FIG. 8 is a conceptual diagram of a graphics processing pipeline implemented by the PPU of FIG. 5, in accordance with at least one embodiment of the present disclosure.

FIG. 8 is a conceptual diagram of a graphics processing pipeline 800 implemented by the PPU 500 of FIG. 5, in accordance with an embodiment. The graphics processing pipeline 800 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 800 receives input data 801 that is transmitted from one stage to the next stage of the graphics processing pipeline 800 to generate output data 802. In an embodiment, the graphics processing pipeline 800 may represent a graphics processing pipeline defined by the OpenGL® API. As an option, the graphics processing pipeline 800 may be implemented in the context of the functionality and architecture of the previous Figures and/or any subsequent Figure(s).

As shown in FIG. 8, the graphics processing pipeline 800 comprises a pipeline architecture that includes a number of stages. The stages include, but are not limited to, a data assembly stage 810, a vertex shading stage 820, a primitive assembly stage 830, a geometry shading stage 840, a viewport scale, cull, and clip (VSCC) stage 850, a rasterization stage 860, a fragment shading stage 870, and a raster operations stage 880. In an embodiment, the input data 801 comprises commands that configure the processing units to implement the stages of the graphics processing pipeline 800 and geometric primitives (e.g., points, lines, triangles, quads, triangle strips or fans, etc.) to be processed by the stages. The output data 802 may comprise pixel data (e.g., color data) that is copied into a frame buffer or other type of surface data structure in a memory.

The data assembly stage 810 receives the input data 801 that specifies vertex data for high-order surfaces, primitives, or the like. The data assembly stage 810 collects the vertex data in a temporary storage or queue, such as by receiving a command from the host processor that includes a pointer to a buffer in memory and reading the vertex data from the buffer. The vertex data is then transmitted to the vertex shading stage 820 for processing.

The vertex shading stage 820 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 820 may manipulate individual vertex attributes such as position, color, texture coordinates, and the like. In other words, the vertex shading stage 820 performs operations on the vertex coordinates or other vertex attributes associated with a vertex. Such operations commonly include lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 820 generates transformed vertex data that is transmitted to the primitive assembly stage 830.

The primitive assembly stage 830 collects vertices output by the vertex shading stage 820 and groups the vertices into geometric primitives for processing by the geometry shading stage 840. For example, the primitive assembly stage 830 may be configured to group every three consecutive vertices as a geometric primitive (e.g., a triangle) for transmission to the geometry shading stage 840. In some embodiments, specific vertices may be reused for consecutive geometric primitives (e.g., two consecutive triangles in a triangle strip may share two vertices). The primitive assembly stage 830 transmits geometric primitives (e.g., a collection of associated vertices) to the geometry shading stage 840.

The geometry shading stage 840 processes geometric primitives by performing a set of operations (e.g., a geometry shader or program) on the geometric primitives. Tessellation operations may generate one or more geometric primitives from each geometric primitive. In other words, the geometry shading stage 840 may subdivide each geometric primitive into a finer mesh of two or more geometric primitives for processing by the rest of the graphics processing pipeline 800. The geometry shading stage 840 transmits geometric primitives to the viewport SCC stage 850.

In an embodiment, the graphics processing pipeline 800 may operate within a multiprocessor and the vertex shading stage 820, the primitive assembly stage 830, the geometry shading stage 840, the fragment shading stage 870, and/or hardware/software associated therewith, may sequentially perform processing operations. Once the sequential processing operations are complete, in an embodiment, the viewport SCC stage 850 may utilize the data. In an embodiment, primitive data processed by one or more of the stages in the graphics processing pipeline 800 may be written to a cache (e.g., L1 cache, a vertex cache, etc.). In this case, in an embodiment, the viewport SCC stage 850 may access the data in the cache. In an embodiment, the viewport SCC stage 850 and the rasterization stage 860 are implemented as fixed function circuitry.

The viewport SCC stage 850 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum). Furthermore, geometric primitives may each be scaled based on a depth of the viewing frustum. All potentially visible geometric primitives are then transmitted to the rasterization stage 860.

The rasterization stage 860 converts the 3D geometric primitives into 2D fragments (e.g., capable of being utilized for display, etc.). The rasterization stage 860 may be configured to utilize the vertices of the geometric primitives to setup a set of plane equations from which various attributes can be interpolated. The rasterization stage 860 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 860 generates fragment data (e.g., interpolated vertex attributes associated with a particular sample location for each covered pixel) that are transmitted to the fragment shading stage 870.

The fragment shading stage 870 processes fragment data by performing a set of operations (e.g., a fragment shader or a program) on each of the fragments. The fragment shading stage 870 may generate pixel data (e.g., color values) for the fragment such as by performing lighting operations or sampling texture maps using interpolated texture coordinates for the fragment. The fragment shading stage 870 generates pixel data that is transmitted to the raster operations stage 880.

The raster operations stage 880 may perform various operations on the pixel data such as performing alpha tests, stencil tests, and blending the pixel data with other pixel data corresponding to other fragments associated with the pixel. When the raster operations stage 880 has finished processing the pixel data (e.g., the output data 802), the pixel data may be written to a render target such as a frame buffer, a color buffer, or the like.

It will be appreciated that one or more additional stages may be included in the graphics processing pipeline 800 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 840). Other types of graphics processing pipelines are contemplated as being within the scope of the present disclosure. Furthermore, any of the stages of the graphics processing pipeline 800 may be implemented by one or more dedicated hardware units within a graphics processor such as PPU 500. Other stages of the graphics processing pipeline 800 may be implemented by programmable hardware units such as the multiprocessors 640 of the PPU 500.

The graphics processing pipeline 800 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 500. The API provides an abstraction for a programmer that lets a programmer utilize specialized graphics hardware, such as the PPU 500, to generate the graphical data without requiring the programmer to utilize the specific instruction set for the PPU 500. The application may include an API call that is routed to the device driver for the PPU 500. The device driver interprets the API call and performs various operations to respond to the API call. In some instances, the device driver may perform operations by executing instructions on the CPU. In other instances, the device driver may perform operations, at least in part, by launching operations on the PPU 500 utilizing an input/output interface between the CPU and the PPU 500. In an embodiment, the device driver is configured to implement the graphics processing pipeline 800 utilizing the hardware of the PPU 500.

Various programs may be executed within the PPU 500 in order to implement the various stages of the graphics processing pipeline 800. For example, the device driver may launch a kernel on the PPU 500 to perform the vertex shading stage 820 on one multiprocessor 640 (or multiple multiprocessors 640). The device driver (or the initial kernel executed by the PPU 500) may also launch other kernels on the PPU 500 to perform other stages of the graphics processing pipeline 800, such as the geometry shading stage 840 and the fragment shading stage 870. In addition, some of the stages of the graphics processing pipeline 800 may be implemented on fixed unit hardware such as a rasterizer or a data assembler implemented within the PPU 500. It will be appreciated that results from one kernel may be processed by one or more intervening fixed function hardware units before being processed by a subsequent kernel on a multiprocessor 640.

Machine Learning

Deep neural networks (DNNs) developed on processors, such as the PPU 500, have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it to get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 500. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 500 is a computing platform capable of delivering performance required for deep neural network-based artificial intelligence and machine learning applications.

What is claimed is:

1. A system comprising:

a central processing unit (CPU); and a first input/output (I/O) device coupled with the CPU, wherein the first I/O device is configured to:

translate a first virtual address into a first physical address using a first translation agent associated with the first I/O device;

send a first address translation request to a second translation agent associated with the CPU, wherein the first address translation request comprises the first physical address;

receive a first address translation response from the second translation agent, the first address translation response comprising a second physical address, wherein the second physical address is associated with an address space of the system; and merge the first address translation response with one or more attributes obtained by the first translation agent, wherein the first address translation response further includes one or more attributes obtained from the second translation agent.

2. The system of claim 1, wherein the second translation agent comprises an input/output memory management unit (IOMMU) or a system memory management unit (SMMU).

3. The system of claim 1, wherein the first I/O device comprises a graphics processing unit (GPU) and the first translation agent comprises a graphics memory management unit (GMMU).

4. The system of claim 1, wherein the first I/O device includes a cache, and wherein the second physical address is used as a tag within the cache.

5. The system of claim 4, wherein the cache of the first I/O device is coherent with one or more caches of the CPU.

6. The system of claim 1, wherein the first address translation request is sent to the second translation agent in response to a determination that the first physical address is associated with a system memory of the CPU.

7. The system of claim 1, wherein to translate the first virtual address into the first physical address using the first translation agent, the first I/O device is configured to:

identify a page table of the first translation agent using a page directory base (PDB) identifier, wherein the page table serves a virtual machine (VM) of the system as indicated by the PDB identifier; and translate the first virtual address into the first physical address using the identified page table.

8. The system of claim 1, wherein the system further comprises a second I/O device coupled with the first I/O device via a chip-to-chip (C2C) interconnect, and wherein the first I/O device is further to:

translate a second virtual address into a fabric linear address (FLA) using the first translation agent;

determine that the FLA is associated with the second I/O device, wherein the second I/O device is a remote I/O device;

send a second address translation request to the second I/O device, wherein the second address translation request contains the FLA; and receive a second address translation response from the second I/O device, the second address translation response comprising data associated with the FLA.

9. A method comprising:

translating a first virtual address into a first physical address using a first translation agent associated with a first input/output (I/O) device of a system;

sending a first address translation request to a second translation agent associated with a central processing unit (CPU) of the system, wherein the first address translation request comprises the first physical address;

receiving a first address translation response from the second translation agent, the first address translation response comprising a second physical address, wherein the second physical address is associated with an address space of the system; and merging the first address translation response with one or more attributes obtained by the first translation agent, wherein the first address translation response further includes one or more attributes obtained from the second translation agent.

10. The method of claim 9, wherein the second translation agent comprises an input/output memory management unit (IOMMU) or a system memory management unit (SMMU).

11. The method of claim 9, wherein the first I/O device comprises a graphics processing unit (GPU) and the first translation agent comprises a graphics memory management unit (GMMU).

12. The method of claim 9, wherein the first I/O device includes a cache, and wherein the second physical address is used as a tag within the cache.

13. The method of claim 12, wherein the cache of the first I/O device is coherent with one or more caches of the CPU.

14. The method of claim 9, wherein the first address translation request is sent to the second translation agent in response to a determination that the first physical address is associated with a system memory of the CPU.

15. The method of claim 9, wherein translating the first virtual address into the first physical address using the first translation agent comprises:

identifying a page table of the first translation agent using a page directory base (PDB) identifier, wherein the page table serves a virtual machine (VM) of the system as indicated by the PDB identifier; and translating the first virtual address into the first physical address using the identified page table.

16. The method of claim 9, further comprising:

translating a second virtual address into a fabric linear address (FLA) using the first translation agent;

determining that the FLA is associated with a second I/O device, wherein the second I/O device is a remote I/O device;

sending a second address translation request to the second I/O device, wherein the second address translation request contains the FLA; and receiving a second address translation response from the second I/O device, the second address translation response comprising data associated with the FLA.

17. One or more processors comprising processing circuitry to:

translate a first virtual address into a first physical address using a first translation agent associated with a first input/output (I/O) device of a system;

send a first address translation request to a second translation agent associated with a central processing unit (CPU) of the system, wherein the first address translation request comprises the first physical address;

receive a first address translation response from the second translation agent, the first address translation response comprising a second physical address, wherein the second physical address is associated with an address space of the system; and merge the first address translation response with one or more attributes obtained by the first translation agent, wherein the first address translation response further includes one or more attributes obtained from the second translation agent.

* * * * *